US007822508B2

(12) United States Patent
Sugiyama et al.

(10) Patent No.: US 7,822,508 B2
(45) Date of Patent: Oct. 26, 2010

(54) AUTONOMOUS MOBILE ROBOT AND GOODS CARRYING METHOD OF USING THE SAME

(75) Inventors: Kenichiro Sugiyama, Saitama (JP); Taro Yokoyama, Saitama (JP); Takeshi Koshiishi, Saitama (JP); Hiroyuki Makino, Saitama (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 587 days.

(21) Appl. No.: 11/636,597

(22) Filed: Dec. 11, 2006

(65) Prior Publication Data
US 2007/0152619 A1  Jul. 5, 2007

(30) Foreign Application Priority Data
Dec. 12, 2005  (JP)  ............................. 2005-358355

(51) Int. Cl.
*G06F 19/00* (2006.01)

(52) U.S. Cl. ................................... 700/245; 318/568.12

(58) Field of Classification Search ................. 700/245; 318/568.12
See application file for complete search history.

(56) References Cited

U.S. PATENT DOCUMENTS

| | | | | |
|---|---|---|---|---|
| 4,575,297 A | * | 3/1986 | Richter | 414/5 |
| 4,575,304 A | * | 3/1986 | Nakagawa et al. | 414/730 |
| 4,617,502 A | * | 10/1986 | Sakaue et al. | 318/568.18 |
| 4,946,380 A | * | 8/1990 | Lee | 623/24 |
| 5,373,747 A | * | 12/1994 | Ogawa et al. | 73/862.581 |
| 6,580,246 B2 | * | 6/2003 | Jacobs | 318/568.16 |
| 6,584,375 B2 | * | 6/2003 | Bancroft et al. | 700/213 |
| 6,667,592 B2 | * | 12/2003 | Jacobs et al. | 318/568.12 |
| 6,697,044 B2 | * | 2/2004 | Shahoian et al. | 345/156 |
| 6,697,709 B2 | * | 2/2004 | Kuroki et al. | 700/245 |

(Continued)

FOREIGN PATENT DOCUMENTS

CN    1590038 A    3/2005

(Continued)

OTHER PUBLICATIONS

Inoue et al.,Overview of humanoid robotics project of METI, Apr. 2001, proceedings of the 32nd ISR, pp. 1-5.*

(Continued)

*Primary Examiner*—Khoi Tran
*Assistant Examiner*—Jaime Figueroa
(74) *Attorney, Agent, or Firm*—Squire, Sanders & Dempsey L.L.P.

(57) ABSTRACT

The autonomous mobile robot having an openable and closable gripper for gripping goods, cameras, an autonomous mobile means, and a control means for making the robot carry the goods to a destination from an acquisition source, the control means comprising: a grip position recognition means configured to recognize a predetermined position suitable for gripping a carrier container of a predetermined specification configured to place the goods to carry, based on an image of the acquisition source taken by the cameras; a grip control means configured to drive the gripper to the predetermined position of the carrier container and to control gripping the predetermined position; and a grip-success-or-not determination means configured to determine whether or not the gripping is successful, based on an external force acting on the gripper.

8 Claims, 26 Drawing Sheets

U.S. PATENT DOCUMENTS

| | | | |
|---|---|---|---|
| 6,865,446 B2* | 3/2005 | Yokono et al. | 700/245 |
| 6,898,485 B2* | 5/2005 | Kuroki et al. | 700/245 |
| 7,112,938 B2* | 9/2006 | Takenaka et al. | 318/568.12 |
| 2002/0165638 A1* | 11/2002 | Bancroft et al. | 700/213 |
| 2002/0165643 A1* | 11/2002 | Bancroft et al. | 700/245 |
| 2003/0030398 A1* | 2/2003 | Jacobs et al. | 318/568.12 |
| 2003/0030399 A1* | 2/2003 | Jacobs | 318/568.16 |
| 2004/0046736 A1* | 3/2004 | Pryor et al. | 345/156 |
| 2004/0140787 A1* | 7/2004 | Okamoto et al. | 318/568.21 |
| 2004/0215463 A1* | 10/2004 | Aoyama et al. | 704/270 |
| 2004/0236469 A1* | 11/2004 | Moridaira et al. | 700/245 |
| 2005/0006915 A1* | 1/2005 | Matsuda | 294/99.1 |
| 2005/0038560 A1* | 2/2005 | Nagasaka | 700/245 |
| 2005/0055131 A1* | 3/2005 | Mikami et al. | 700/245 |
| 2005/0113977 A1* | 5/2005 | Nihei et al. | 700/245 |
| 2005/0117033 A1* | 6/2005 | Matsui | 348/239 |
| 2005/0165507 A1* | 7/2005 | Shimizu et al. | 700/245 |
| 2005/0240307 A1* | 10/2005 | Kuroki et al. | 700/245 |
| 2006/0047361 A1* | 3/2006 | Sato et al. | 700/245 |
| 2007/0124024 A1 | 5/2007 | Okamoto et al. | |
| 2007/0239315 A1 | 10/2007 | Sato et al. | |

FOREIGN PATENT DOCUMENTS

| | | |
|---|---|---|
| EP | 0978770 A2 | 2/2000 |
| EP | 1671758 A1 | 6/2006 |
| JP | 2000-263481 | 9/2000 |
| JP | 2005-219161 | 8/2005 |
| JP | 2006-167837 | 6/2006 |
| WO | 2005/099971 A1 | 10/2005 |

OTHER PUBLICATIONS

Wahde et al., A brief review of bipedal robotics research, 2002, Proceedings of the 8th UK Mechatronics forum international conference, pp. 480-488.*

Kaneko et al., Humanoid robot HRP-2, Apr. 2004, IEEE, 2004 International conference on robotics and automation New Orleans, pp. 1083-1090.*

Yokoi et al, A Honda humanoid robot controlled by AIST software, 2001, IEEE-RAS, International conference on humanoids robots, pp. 259-264.*

Nagata et al., Delivery by hand between human and robot based on fingertip force-torque information, Oct. 1998, IEEE/RSJ, International conference on intelligent robots and systems, Canada, pp. 750-757.*

Mascaro et al., Measurement of finger posture and three-axis fingertip touch force using fingernail sensors, Feb. 2004, IEEE, Transactions on robotics and automation vol. 20, No. 1, pp. 26-35.*

Zecca et al., On the Development of the Emotion Expression Humanoid Robot WE-4RII with RCH-1, Nov. 10, 2004, IEEE, International conference Humanoids 2004, pp. 235-252.*

Kim et al, Control of a robot Hand Emulating Human's Hand-Over Motion, Feb. 2002, Mechatronics vol. 12, No. 1, pp. 55-69.*

Becker et al., GripSee: A gesture-Controlled Robot for Object Perception and Manipulation, 1999, Autonomous Robots 6, pp. 203-221.*

Tzafestas, Spyros G., Integrated sensor-based intelligent robot system, Apr. 1988, IEEE Control systems magazine, 0272-1708/88/0400-0061, pp. 61-72.*

Chinese Office Action 2006101656738 dated Jul. 4, 2008.

European Search Report dated Sep. 29, 2009 for Application No. EP 06 02 5603.

Shibata et al., "Hierarchical Intelligent Control for Robotic Motion," IEEE Transactions on Neural Networks, Sep. 1994, vol. 5, No. 5, pp. 823-832.

Cipolla et al., "Visually Guided Grasping in Unstructured Environments," Robotics and Autonomous Systems, Elsevier Science Publishers, Mar. 1997, vol. 19, No. 3-4, pp. 337-346.

Smith et al., "Using Vision-Based Control Techniques for Grasping Objects," IEEE, Oct. 22, 1995, vol. 5, pp. 4434-4439.

* cited by examiner

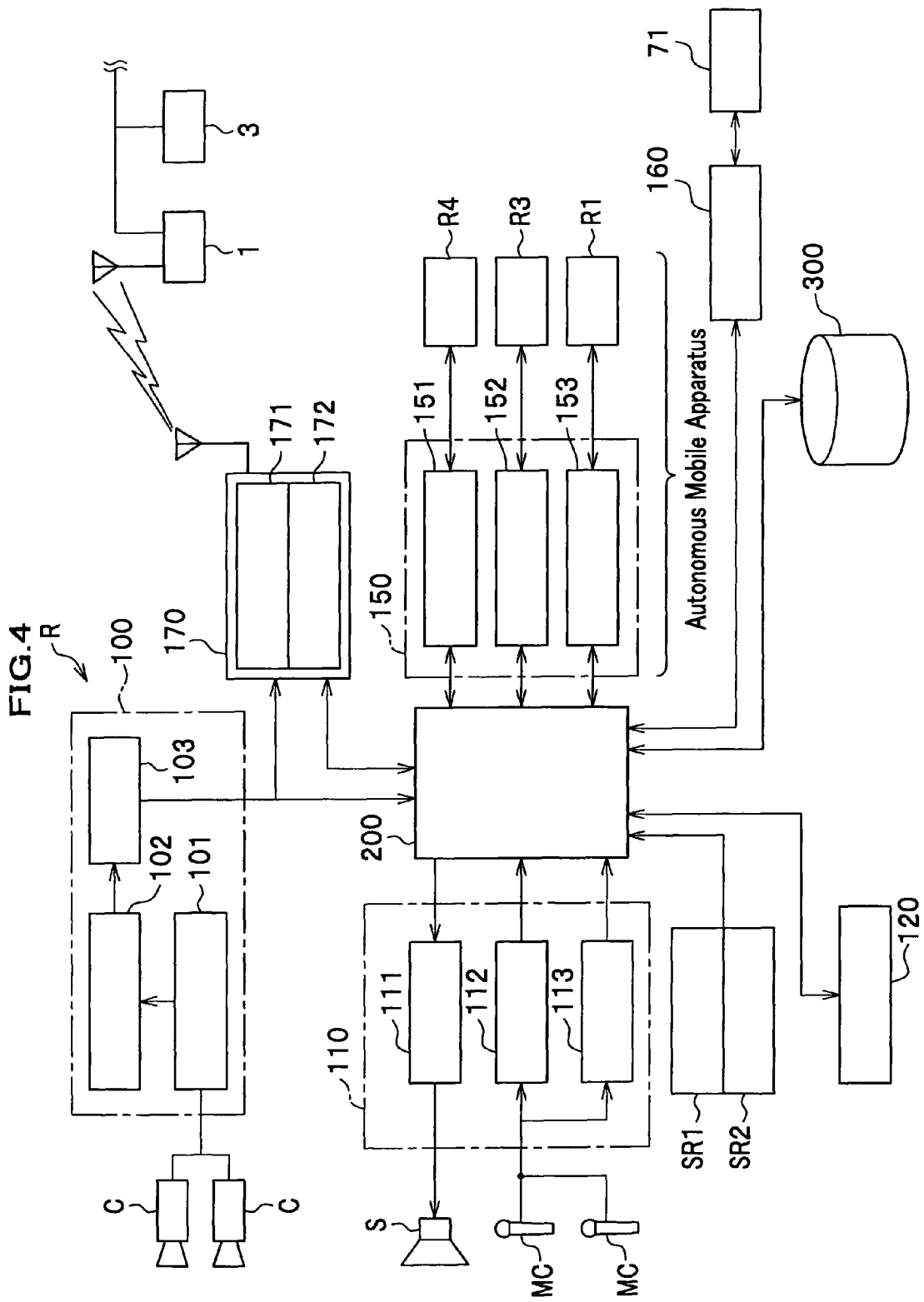

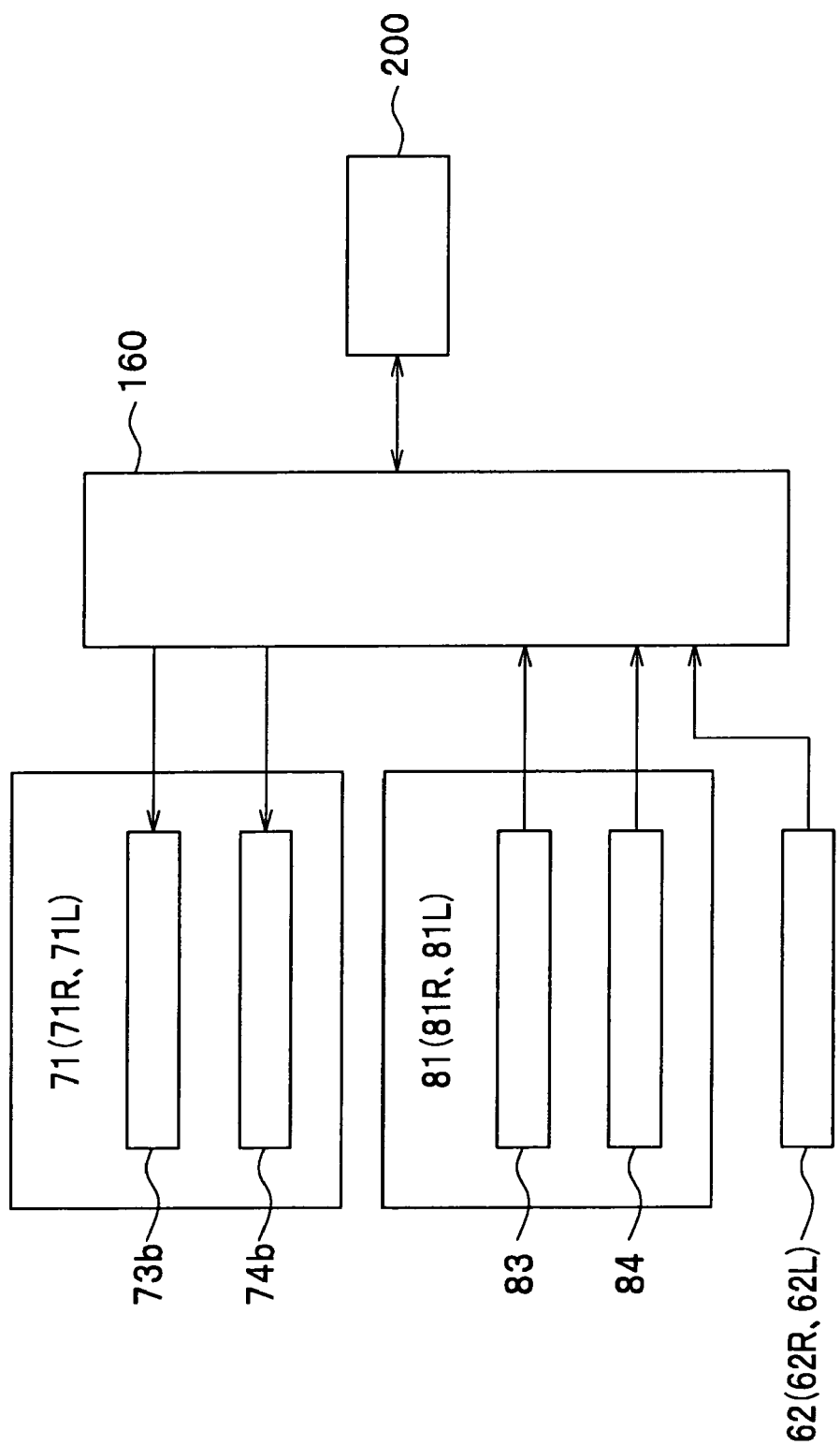

Receipt Flow (Case of Acquisition Source being Person)

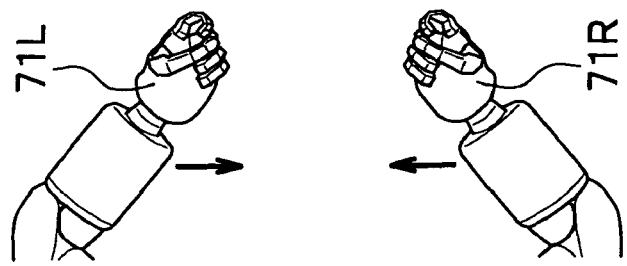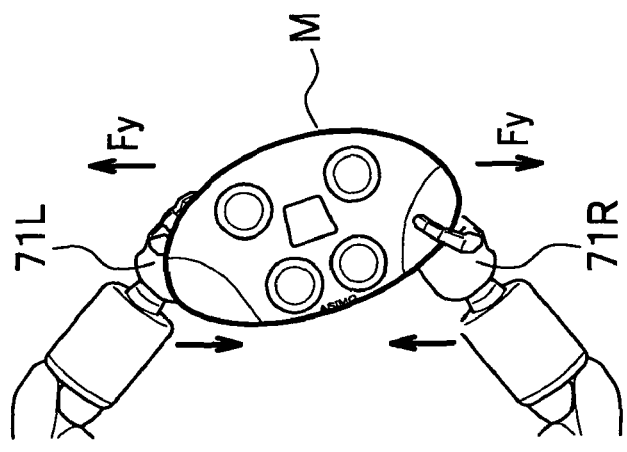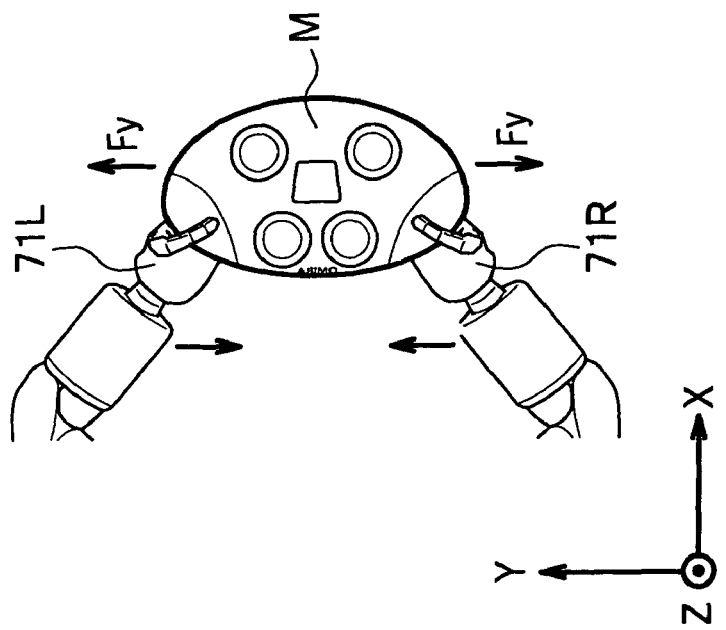

Goods Storage Space Flow

AUTONOMOUS MOBILE ROBOT AND GOODS CARRYING METHOD OF USING THE SAME

BACKGROUND OF THE INVENTION

1. Field of the Invention

The present invention relates to an autonomous mobile robot, and more particularly, to a technology of making a hand of the robot hold goods and carry it.

2. Description of the Related Art

Recently are performed various attempts for making an autonomous mobile robot carry goods. For example, the applicant has already proposed a goods carrying system enabled to perform a receiving movement without giving a person an uncomfortable feeling when the robot receives goods from her/him (see JP 2004-361467 (paragraphs 0151 to 0175, FIGS. 13 to 28). The robot of the system includes such an openable and closable gripper for gripping goods, an external force detection means for detecting an external force acting on the gripper, an opening detection means for detecting an opening of the gripper, and an autonomous mobile means; receives the goods from a person; and can deliver the goods to a destination such as a person and a placement place. When the gripper detects an external force not less than a first predetermined value in a state of not gripping goods, the robot of the system is configured to make the gripper start the receiving movement, and to determine a receiving movement completion during the receiving movement, based on at least one of the detected external force and opening of the gripper.

However, in the conventional system of the JP 2004-361467 the robot is assumed to receive goods from a person (hereinafter referred to as "passive receipt"). In other words, when the robot receives goods from a person, it is requested for her/him to position the goods to the gripper (corresponding to a human hand) held forth by the robot and to push the goods with a certain degree of force. Therefore, a work is requested for a person, though slightly, to hand goods because she/he is requested to pay some attention to the gripper held forth by the robot and to make the robot hold the goods.

Furthermore, when the robot grips received goods and moves to a destination, it is not possible to carry a liquid such as a beverage and difficult to carry it in a state of especially not being lidded because the gripper vibrates every step by which the robot proceeds.

Considering the above points, in handing goods from a person to a robot, it is convenient if the robot can take the initiative to receive (tentatively referred to as "initiative receipt") goods put on a predetermined place or held forth by her/him without a necessity of an assistant movement accompanied with an attentive positioning by her/him.

Furthermore, it is convenient also for carrying a liquid if it is possible to suppress a vibration (tentatively referred to as "vibration suppression control") of a gripper while carrying from an acquisition source to a destination.

Consequently, a robot is requested that can take the initiative to receive goods from an acquisition source, carry the goods with suppressing its vibration while carrying by the vibration suppression control, and surely deliver the goods.

Furthermore, a goods carrying method is requested that enables an autonomous mobile robot to take the initiative (without a personal assistance) to receive goods from an acquisition source, to carry the goods with suppressing its vibration during carrying by the vibration suppression control, and to surely deliver the goods.

SUMMARY OF THE INVENTION

A first aspect of the present invention is an autonomous mobile robot having an openable and closable gripper for gripping goods, a camera, an autonomous mobile means, and a control means for making the robot carry the goods to a destination from an acquisition source, the control means comprising: a grip position recognition means configured to recognize a predetermined position suitable for gripping a carrier container of a predetermined specification configured to place the goods to carry, based on an image of the acquisition source taken by the camera; a grip control means configured to drive the gripper to the predetermined position of the carrier container and to control gripping the predetermined position; and a grip-success-or-not determination means configured to determine whether or not the gripping is successful, based on an external force acting on the gripper.

In accordance with the configuration, because the autonomous mobile robot recognizes the predetermined position of the carrier container, drives the gripper to the predetermined position of the carrier container, grips the predetermined position, and determines whether or not the gripping is successful, based on the external force acting on the gripper, it is possible to surely take the carrier container without a personal assistance.

A second aspect of the present invention is an autonomous mobile robot further comprising a vibration suppression controller configured to perform feedback control configured to cancel an external force acting on the gripper while carrying the goods to the destination.

In accordance with the configuration, because the autonomous mobile robot can carry goods, suppressing a vibration of the gripper while carrying the goods, it is possible to carry such a liquid.

A third aspect of the present invention is an autonomous mobile robot, wherein the vibration suppression controller is provided for every actuator configured to move a joint configured to decide a movement of the gripper, and comprises an actuator controller configured to control to drive each actuator; an extraction means configured to obtain an acceleration component added to the gripper, based on an external force acting on the gripper and to extract only a component responsive by the actuator controller based on the acceleration component; and an application means configured to divide the component extracted by the extraction means according to a predetermined calculation into a signal for the each actuator and to add the divided each signal to a speed control loop of a corresponding actuator controller.

In accordance with the configuration the autonomous mobile robot can get a same effect as the second aspect.

A fourth aspect of the present invention is an autonomous mobile robot, wherein the acceleration component comprises at least one of a vertical direction force added to the gripper and a moment around an axis in a left and right direction of the robot added to the gripper.

In accordance with the configuration, because the autonomous mobile robot can reduce a handled component, it is possible to simplify the configuration.

A fifth aspect of the present invention is an autonomous mobile robot further comprising a receipt-and-handover height decision means configured to decide a target position, based on a height of a placement place where the carrier container of the destination is placed; a gripper move means configured to lower the gripped carrier container to the target position; and a handover-completion determination means configured to determine whether or not the placement of the carrier container is completed, based on the external force acting on the gripper.

In accordance with the configuration, because the autonomous mobile robot decides the target position, based on the height of the placement place where the carrier container of the destination is placed, lowers the gripped carrier container to the target position, and determines whether or not the placement of the carrier container is completed, based on a detection value from a force sensor, it is possible to put the carrier container without a personal assistance.

A sixth aspect of the present invention is an autonomous mobile robot further comprising a placement-success-or-not determination means configured to determine whether or not a placement is successful before the placement of the carrier container is completed, based on whether or not the gripper is lowered to a predetermined height.

In accordance with the configuration, if the gripper is lowered to the predetermined height before the placement of the carrier container is completed, the autonomous mobile robot determines that the placement is unsuccessful; therefore, it is possible to omit a wasteful movement by setting the predetermined height near a lower limit of a movable region of the gripper.

A seventh aspect of the present invention is an autonomous mobile robot, wherein the vibration suppression controller further comprises a learning degree determination means configured to determine a learning degree of a person with respect to handover in a case of the acquisition source being the person, and wherein the grip control means adjusts a movement speed, depending on the learning degree.

In accordance with the configuration, because the autonomous mobile robot adjusts the movement speed of the grip control, depending on the learning degree, it is possible not to give a sense of anxious feeling to a person determined to be low in the learning degree and for a person determined to be high in the learning degree not to feel a botheration.

Moreover, an eighth aspect of the present invention is a goods carrying method of making a robot carry goods to a destination from an acquisition source, the robot having an openable and closable gripper for gripping the goods, a camera, and an autonomous mobile means, the method comprising: a grip position recognition step of recognizing a predetermined position suitable for gripping a carrier container of a predetermined specification configured to place goods to carry, based on an image of the acquisition source taken by the camera; a grip control step of driving the gripper to the predetermined position of the carrier container and controlling gripping the predetermined position; a grip-success-or-not determination step of determining whether or not the gripping is successful, based on an external force acting on the gripper; and a vibration suppression control step of performing feedback control for canceling an external force acting on the gripper while carrying the goods to the destination.

In accordance with the goods carrying method, because the method enables an autonomous mobile robot to recognize the predetermined position of the carrier container, to drive the gripper to the predetermined position of the carrier container, to grip the predetermined position, and to determine whether or not the gripping is successful, based on the external force acting on the gripper, it is possible to surely take the carrier container without a personal assistance.

BRIEF DESCRIPTION OF THE DRAWINGS

FIG. 4 is a functional block diagram showing an inner structure of the robot in FIG. 1.

FIG. 5A shows an opened state of the fingers; and FIG. 5B shows a closed state of the fingers.

FIG. 6 is a block diagram showing a gripper, opening detection means, and external force detection device of the robot.

FIGS. 18A, 18B, and 18C are drawings illustrating a determination of whether or not gripping is successful; FIG. 18A is a drawing showing successful state of the gripping; and FIGS. 18B and 18C are drawings showing unsuccessful states of the gripping.

BEST MODES FOR CARRYING OUT THE INVENTION

Here will be described the present invention in detail according to embodiments and attached drawings of the invention. In addition, in a case of showing a same element in a plurality of the drawings, a same symbol will be appended thereto.

<Configuration of Robot Control System>

Firstly will be described a robot control system A with respect to an embodiment of the present invention.

Figure 1:
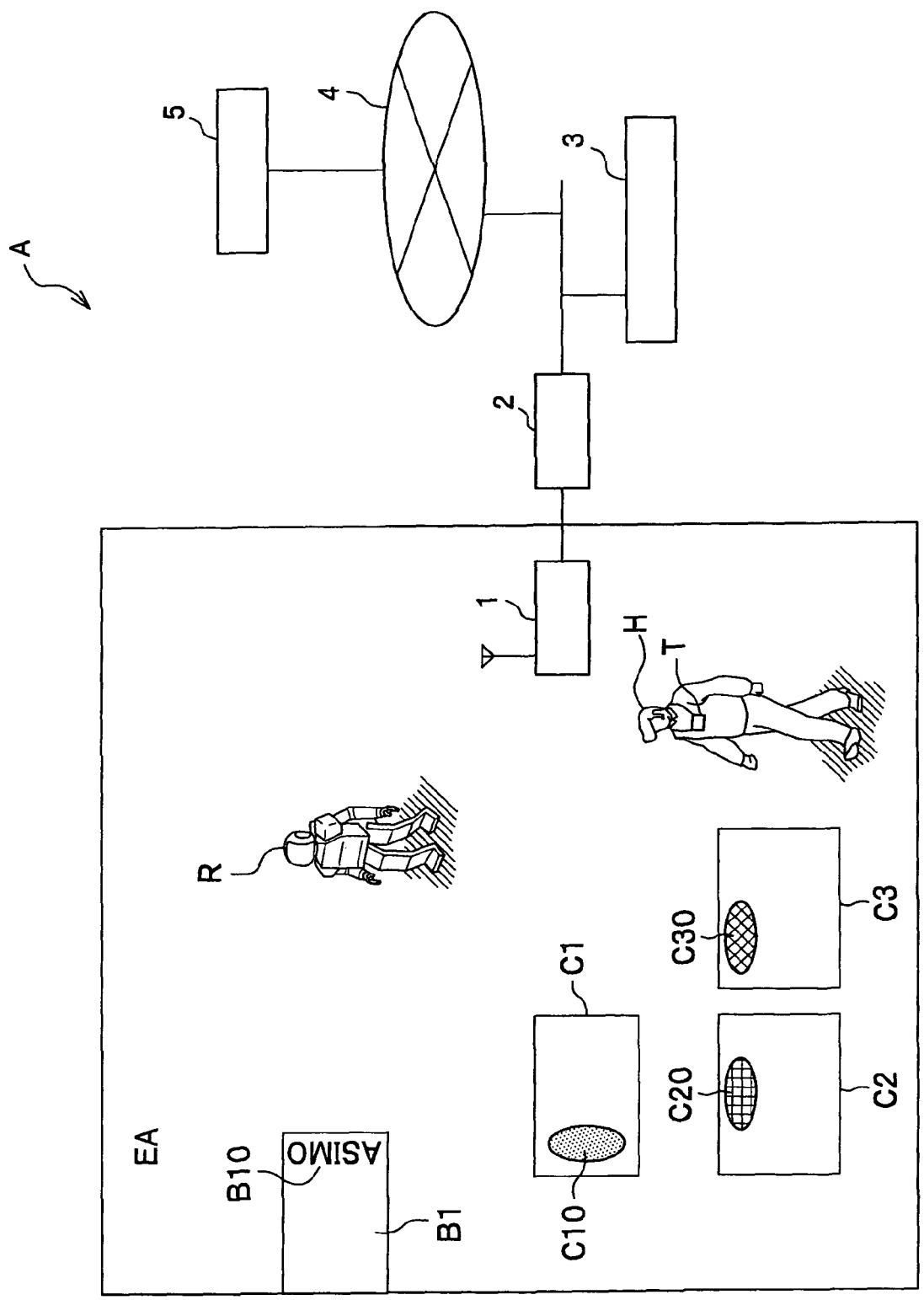
FIG. 1 is a system configuration drawing showing an appearance of a robot control system with respect to an embodiment of the present invention.

As shown in FIG. 1, the robot control system A comprises one or more robots R (one in the embodiment) disposed in a task execution area (robot operation area) EA, a base station (for example, wireless LAN ((Local Area Network)) 1 connected to the robots R by wireless communications, a robot manager (for example, a server) 3 connected to the base station 1 via a router 2, and a terminal 5 connected to the robot manager 3 via a network 4.

The robot R is disposed in the task execution area EA, performs an autonomous move within the area EA, and executes a task such as carrying goods, based on an execution order signal. In addition, within the task execution area EA are provided a goods storage space B1 for placing goods to carry and destination goods storage spaces C1 to C3 of one or more destinations. The goods storage space B1 and the destination goods storage spaces C1 to C3 are, for example, such a table and a counter. Furthermore, in the task execution area EA, there exists a person H who puts on a tag T for detection, and hands goods to the robot R. The robot R can put goods on the goods storage space C3 in such a case of not being able to find out the person H to whom the goods is to be handed.

In order to make the robot R execute a task, the robot manager 3 generates an execution order signal including a content of the task and outputs the signal to the robot R, based on task data input from the terminal 5 described later. The task data is data with respect to the task which the robot R is made to execute, and for example, includes such a person handing goods to the robot R, a person to whom the robot R hands goods, and a kind of goods to carry.

The terminal 5 is an input device for inputting task data to the robot manager 3 and is such a desktop computer and a PHS (Personal Handyphone System). Furthermore, the terminal 5 is also an output (display) device for outputting an operation report signal (task execution completion report signal) transmitted from the robot R so that a person can check.

<Configuration of Robot>

Subsequently will be described the robot R with respect to the embodiment. In a description below an X-axis is taken in a front and rear direction; a Y-axis, in a left and right direction; and a Z-axis, in an up and down direction (see FIG. 2).

The robot R with respect to the embodiment is a bipedal mobile robot of an autonomous mobile type. The robot R executes a task, based on an execution order signal transmitted from the robot manager 3.

Figure 2:
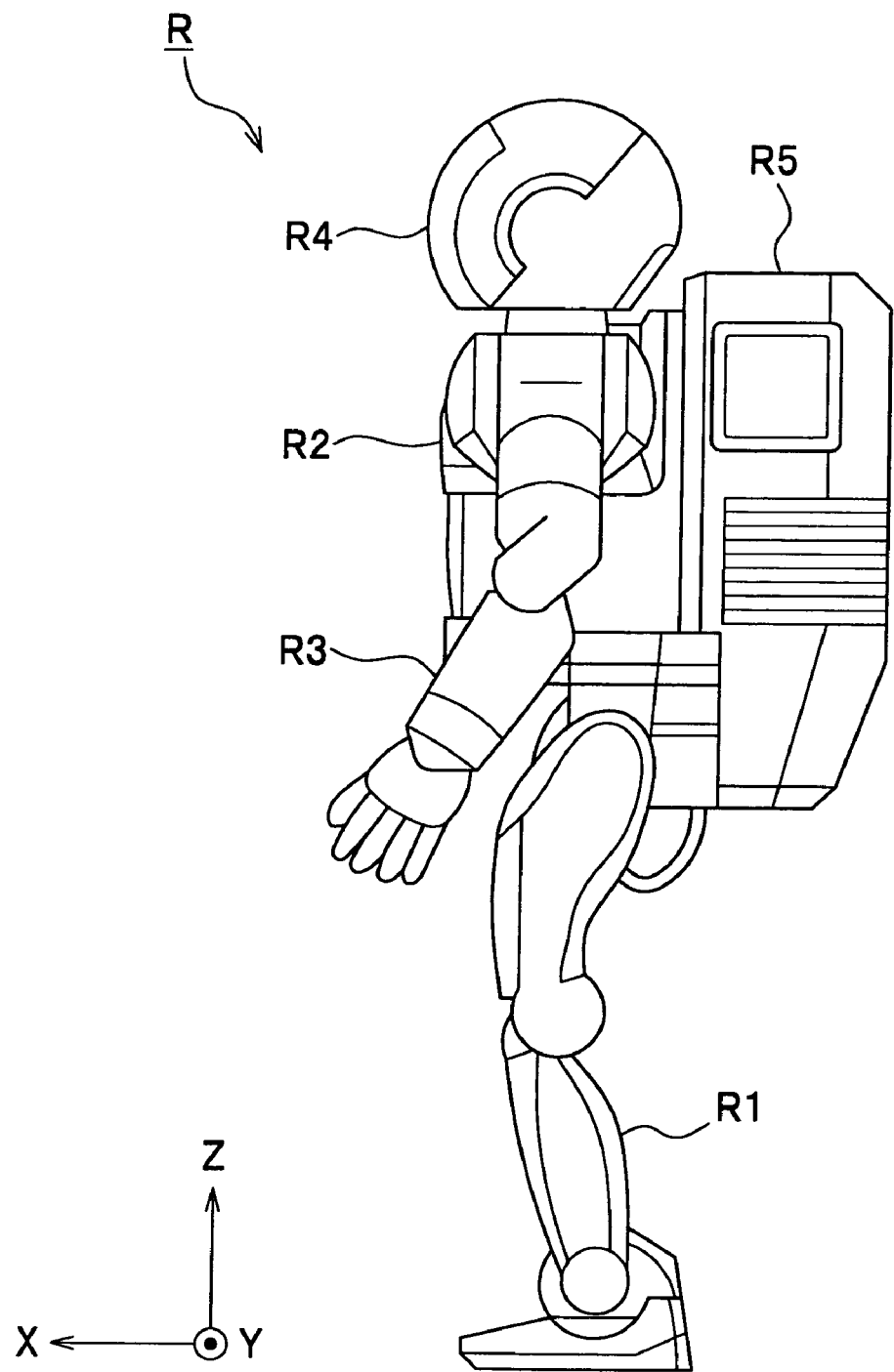
FIG. 2 is a side view showing an appearance of the robot in FIG. 1.

As shown in FIG. 2, the robot R stands up and moves (walks, runs, and the like) by two legs R1 (only one shown); comprises an body R2, two arms R3 (only one shown), and a head R4; and autonomously moves. Furthermore, the robot R comprises a control device mount unit R5 configured to mount a control device for controlling movements of the legs R1, the body R2, the arms R3, and the head R4 on a back thereof (rear unit of the unit R2) in a manner of shouldering the unit R5.

<Drive Structure of Robot>

Subsequently will be described a drive structure of the robot R. A joint in FIG. 3 is driven by an electric motor.

<Leg>

Figure 3:
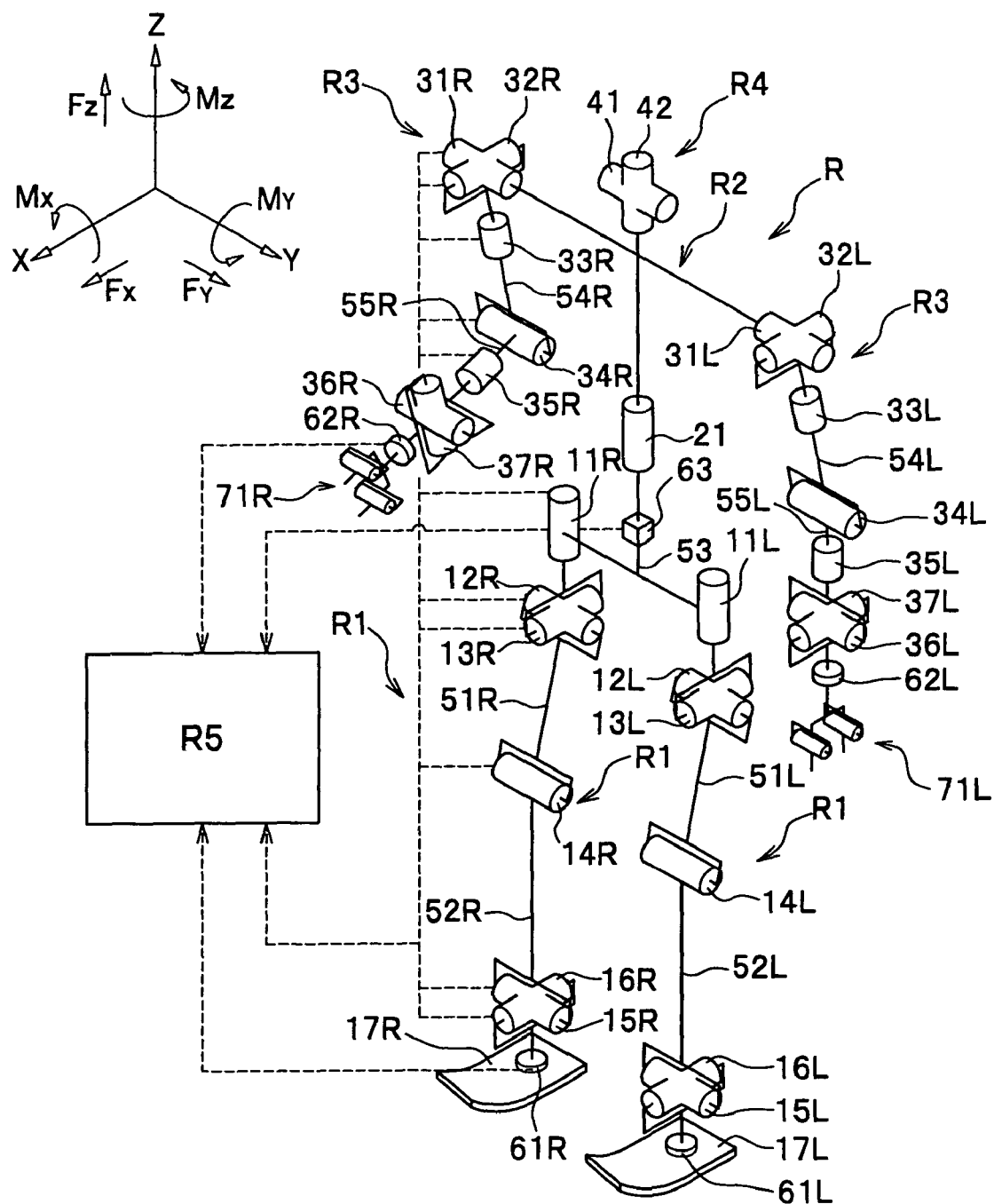
FIG. 3 is a perspective view schematically showing a mechanical structure of the robot in FIG. 1.

As shown in FIG. 3, the left and right legs R1 respectively comprise six joints 11R (L) to 16R (L). Twelve joints totaling left and right are configured with the hip joints 11R, 11L (R means right; L, left; in some case R, L are not appended; hereafter same) for swiveling (around the Z-axis) the legs of a crotch unit (link portion of the legs R1 to the body R2); the hip joints 12R, 12L around a pitch axis (Y-axis) of the crotch unit; the hip joints 13R, 13L around a roll axis (X-axis) of the crotch unit; the knee joints 14R, 14L around pitch axes (Y-axis) of the knee units; the ankle joints 15R, 15L around pitch axes (Y-axis) of the ankles, and the ankle joints 16R, 16L around roll axes (X-axis) of the ankles. Then under the legs R1 are attached foot portions 17R, 17L.

In other words, the legs R1 respectively comprise the hip joints 11R (L), 12R (L), 13R (L); the knee joints 14R (L); and the ankle joints 15R (L) and 16R (L). The hip joints 11R (L) to 13R (L) and the knee joints 14R (L) are respectively linked with thigh links 51R, 51L; the knee joints 14R (L) and the ankle joints 15R (L) and 16R (L) are respectively linked with crus links 52R, 52L.

<Body>

As shown in FIG. 3, the body R2 is a base portion of the robot R and is linked to the legs R1, the arms R3, and the head R4. In other words, the body R2 (upper body link 53) is linked to the legs R1 through the hip joints 11R (L) to 13R (L). Furthermore, the body R2 is linked to the arms R3 through shoulder joints 31R (L) to 33R (L) described later. Still furthermore, the body R2 is linked to the head R4 through neck joints 41, 42 described later.

Furthermore, the body R2 comprises a joint 21 for swiveling the upper body (around the Z-axis).

<Arm>

As shown in FIG. 3, the left and right arms R3 respectively comprise seven joints 31R (L) to 37R (L). Fourteen joints totaling left and right are configured with the shoulder joints 31R, 31L around pitch axes (Y-axis) of the shoulders (link portions of the arms R3 to the body R2); the shoulder joints 32R, 32L around roll axes (X-axis) of the shoulders; the shoulder joints 33R, 33L for swiveling the arms (around the Z-axis); elbow joints 34R, 34L around pitch axes (Y-axis) of the elbow units; arm joints 35R, 35L for swiveling the wrist units (around the Z-axis); wrist joints 36R, 36L around pitch axes (Y-axis) of the wrists; and wrist joints 37R, 37L around roll axes (X-axis) of the wrists. Then at tips of the arms R3 are respectively attached grippers (hands) 71R, 71L.

In other words, the arms R3 respectively comprise the shoulder joints 31R (L), 32R (L), and 33R (L); the elbow joints 34R (L); the arm joints 35R (L); and the wrist joints 36R (L) and 37R (L). The shoulder joints 31R (L), 32R (L), 33R (L) and the elbow joints 34R (L) are linked with an upper arm link 54R (L); the elbow joints 34R (L) and the wrist joints 36R (L), 37R (L) are linked with a forearm link 55R (L).

<Head>

As shown in FIG. 3, the head R4 comprises the neck joint 41 around the Y-axis of the neck unit (link portion of the head R4 to the body R2); and the neck joint 42 around the X-axis of the neck unit. The neck joint 41 sets an inclination angle of the head R4; the neck joint 42 sets a pan of the unit R4.

In accordance with such the configuration the left and right legs R1 are given total twelve degrees of freedom; it is possible to give a desired movement to the units R1 by driving the twelve joints 11R (L) to 16R (L) at an appropriate angle during moving, and thus the robot R can arbitrarily move in a three-dimensional space. Furthermore, the left and right arms R3 are given total fourteen degrees of freedom, and the robot R can perform a predetermined operation by driving the fourteen joints 31R (L) to 37R (L) at an appropriate angle.

Furthermore, between the ankle joints 15R (L), 16R (L) and the ankle unit 17R (L) is provided a well known six-axis force sensor 61R (L). The sensor 61R (L) detects three direction components Fx, Fy, and Fz of a floor reaction force and three direction components Mx, My, and Mz of a moment acting on the robot R from the floor.

Furthermore, between the ankle joints 15R (L), 16R (L) and the gripper 71R (L) is provided a well known six-axis force sensor 62R (L). The sensor 62R (L) detects three direction components Fx, Fy, and Fz of a reaction force and three direction components Mx, My, and Mz of a moment acting on the gripper 71R (L) of the robot R.

Furthermore, in the body R2 is provided an inclination sensor 63. The sensor 63 detects an inclination against a gravity axis (Z-axis) of the unit R2 and an angular velocity of the inclination.

Furthermore, an electric motor of each joint relatively displaces such the thigh link 51R (L) and the crus link 52R (L) through a reducer (not shown) for decelerating and accelerating output of the motor. An angle of the each joint is detected by a joint angle detection means (for example, a rotary encoder).

The control device mount unit R5 houses such an autonomous mobile controller 150, a gripper controller 160, a wireless communicator 170, a main controller 200, and a battery (not shown). Detection data of each of such the sensors 61 to 63 is sent to each of the controllers within the control device mount unit R5. Furthermore, each electric motor is driven by a drive instruction signal from each of the controllers.

As shown in FIG. 4, in addition to the legs R1, the arms R3, and the head R4, the robot R comprises cameras C, C; a speaker S; mikes MC, MC; an image processor 100; a voice processor 110; an object detector 120; the autonomous mobile controller 150; the gripper controller 160; the wireless communicator 170; the main controller 200; and a memory 300.

Furthermore, the robot R comprises a gyro sensor SR1 and a GPS (Global Positioning System) receiver SR2. The gyro sensor SR1 detects data (direction data) with respect to a direction of the robot R. Furthermore, the GPS receiver SR2 detects data (position data) with respect to a position of the robot R. The data detected by the gyro sensor SR1 and the GPS receiver SR2 is output to the main processor 200, is used in order to decide an action of the robot R, and is transmitted to the robot manager 3 through the wireless communicator 170.

[Camera]

The cameras C, C can take in a video image as digital data, and for example, a color CCD (Charge-Coupled Device) camera is used. The cameras C, C are disposed side by side in parallel, and a taken image is output to the image processor 100. The cameras C, C, the speaker S, and the mikes MC, MC are all arranged inside the head R4.

[Image Processor]

The image processor 100 processes an image taken by the cameras C, C and recognizes an obstacle and a person around the robot R in order to understand a situation there. The image processor 100 comprises a stereo processor 101, a movable body extraction unit 102, and a face recognition unit 103.

The stereo processor 101 performs a pattern matching, making one of two images taken by the left and right cameras C, C to be a standard; calculates an aberration of each corresponding pixel in the left and right images; generates an aberration image; and outputs the generated aberration image and the two original images to the movable body extraction unit 102. In addition, the aberration represents a distance to a shot object from the robot R.

The movable body extraction unit 102 extracts a movable body in a taken image, based on data output from the stereo processor 101. Extracting a moving object (movable body) is to recognize a person, presuming the moving object to be her/him.

In order to extract a movable body, the movable body extraction unit 102 has memorized several frames in the past; performs a pattern matching, comparing a newest frame (image) with the past frames (images); calculates a move amount of each pixel; and generates a move amount image. Then from the aberration image and the move amount image, in a case of there existing a pixel where the move amount is larger within a predetermined distance range from the cameras C, C, the movable body extraction unit 102 presumes an existence of a person at a position of the pixel; extracts a movable body as the aberration image of only the predetermined distance range; and outputs an image of the movable body to the face recognition unit 103.

Furthermore, the movable body extraction unit 102 calculates a height of the extracted movable body, that is, a stature, and outputs it to the face recognition unit 103.

In other words, the movable body extraction unit 102 can specify a personal position against the robot R.

Furthermore, the movable body extraction unit 102 can calculate a personal stature.

The face recognition unit 103 extracts a flesh color portion from an extracted movable body and recognizes a face position from a size and shape of the portion. In addition, a hand position of a person is similarly recognized from such a flesh color region, size, and shape.

As information when the robot R moves and in order to communicate with a person, the recognized face position is output to the main controller 200 and the wireless communicator 170, and is transmitted to the robot manager 3 via the base station 1.

[Speaker]

The speaker S outputs a voice, based on voice data generated by a voice synthesis unit 111 described later.

[Mike]

The mikes MC, MC collect a sound around the robot R. The collected sound is output to a voice recognition unit 112 and a sound source location unit 113 described later.

[Voice Processor]

The voice processor 110 comprises the voice synthesis unit 111, the voice recognition unit 112, and the sound source location unit 113.

The voice synthesis unit 111 generates voice data from character information, based on an instruction of a speech behavior decided and output by the main controller 200, and outputs the voice to the speaker S. In generating the voice data is used a corresponding relationship memorized in advance between the character information and the voice data.

To the voice recognition unit 112 is input voice data from the mikes MC, MC; the unit 12 generates character information from the voice data, based on a corresponding relationship memorized in advance between the voice data and the character information, and outputs the information to the main controller 200.

The sound source location unit 113 specifies a sound source position (distance and direction from the robot R), based on differences of a sound pressure and a sound arrival time between the mikes MC, MC.

[Object Detector]

The object detector 120 detects whether or not a detection object H having a detection tag T exists around the robot R, and in a case of having detected the existence of the object H, specifies a position thereof. With respect to the object detector 120 is described in detail in the JP 2004-361467, and describing the detector 120 more in detail will deviate from the spirit of the present invention; therefore, a further description thereof will be omitted.

[Autonomous Mobile Controller]

As shown in FIG. 4, the autonomous mobile controller 150 comprises a head controller 151, an arm controller 152, and a leg controller 153.

The head controller 151 drives the head R4, following an instruction of the main controller 200; the arm controller 152 drives the arms R3, following an instruction of the main controller 200; and the leg controller 153 drives the legs R1, following an instruction of the main controller 200.

[Gripper Controller]

The gripper controller 160 drives the gripper 71, following an instruction of the main controller 200.

[Wireless Communicator]

The wireless communicator 170 is a communication device for transmitting and receiving data to/from the robot manager 3. The wireless communicator 170 comprises a public line communication device 171 and a wireless communication device 172.

The public line communication device 171 is a wireless communication means for using a public line such as a mobile phone line and a PHS line. On the other hand, the wireless communication device 172 is a wireless communication means by a short distance wireless communication such as a wireless LAN in compliance with IEEE802.11b Standard.

The wireless communicator 170 follows a connection request from the robot manager 3, selects any one of the public line communication device 171 and the wireless communication device 172, and communicates data with the control apparatus 3.

[Gripper]

Figure 5A:
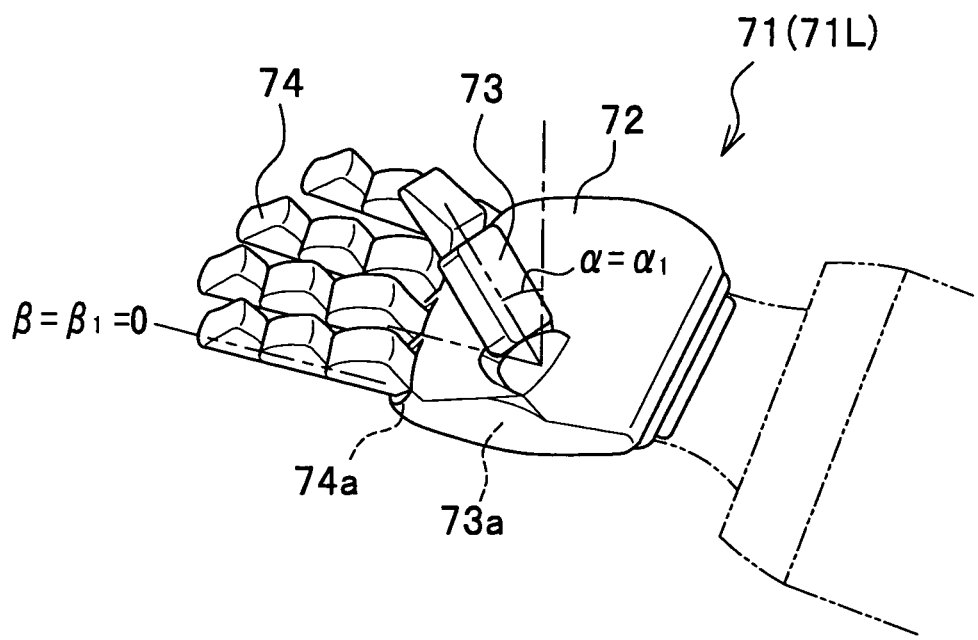
FIGS. 5A and 5B are perspective views showing a gripper of the robot.
Figure 5B:
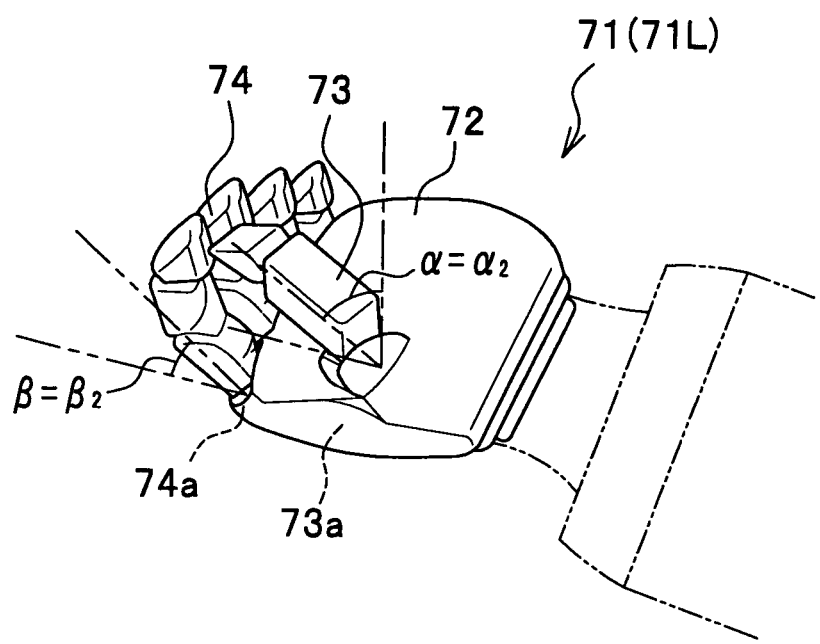

Subsequently will be described the gripper 71R (L) of the robot R more in detail, referring to FIGS. 5A to 6. A pair of the grippers 71R, 71L is symmetry in mirror reflections, and in FIGS. 5A and 5B is shown the left gripper 71L. Hereinafter a description will be made with references without "R" and "L", depending on a case.

As shown in FIGS. 5A and 5B, the gripper 71 comprises a hand 72, a first finger 73, and a second finger 74.

The hand 72 is linked to the forearm link 55 through the wrist joints 36, 37 (see FIG. 3).

The first finger 73 is a portion corresponding to a thumb of a person, and is linked to a base end side of the hand 72 through a first finger joint 73*a*.

The second finger 74 is a portion corresponding to an index finger, middle finger, ring finger, and little finger of a person, and is linked to a tip side of the hand 72 through a second finger joint 74*a*.

Furthermore, within the hand 72 are housed a first finger motor 73*b* for driving the first finger 73 and a second finger motor 74*b* for driving the second finger 74. Furthermore, within the hand 72 are housed a first finger angle detector 83 for detecting a first finger angle α (angle made by the first finger 73 and the hand 72) and a second finger angle detector 84 for detecting a second finger angle β (angle made by the second finger 74 and the hand 72) (see FIG. 6).

The first finger angle α is an angle made by the first finger 73 and the hand 72, and becomes larger from an opened state to closed state of the fingers. The first finger angle α is α in the opened state (full-open in gripping) of the fingers shown in FIG. 5A, and is a2 in the closed state (full-close in gripping) of the fingers shown in FIG. 5B ($\alpha 1 \leq \alpha \leq 2$).

The second finger angle β is an angle made by the second finger 74 and the hand 72, and becomes larger from the opened state to closed state of the fingers. The second finger angle β is β1 (=0) in the opened state (full-open in gripping) of the fingers shown in FIG. 5A, and is β2 in the closed state (full-close in gripping) of the fingers shown in FIG. 5B ($0 \leq \beta \leq \beta 2$).

Here, as a numeral for an opening of the gripper 71, a grip angle deviation θ is defined as follows with respect to the first finger angle α and the second finger angle β:

$$\theta = (\alpha 2 \cdot \alpha) + (\beta 2 \cdot \beta)$$

In other words, the grip angle deviation θ is a numeral representing an opening degree (opening) with respect to the full-open state of the gripper 71, becomes a minimum value θmin=0 in the closed state of the fingers (full-close in gripping), and becomes a maximum value θmax=α2+β2 in the opened state of the fingers (full-open in gripping).

In a state of the gripper 71 holding gripped goods, because each of the finger units 73, 74 stops in a state before becoming the closed state of the fingers, the grip angle deviation θ is a positive value. The grip angle deviation θ has a characteristic of its value becoming larger as a thickness of the gripped goods is larger.

Furthermore, the robot control system A of the embodiment adopts the six-axis force sensor 62 as an external force detection means for detecting an external force acting on the gripper 71 by goods. The six-axis force sensor 62 can also detect a direction of an external force. Therefore, the six-axis force sensor 62 can detect the Z-axis direction force Fx, the Y-axis direction force Fy, and the Z-axis direction force Fz out of the external force acting on the gripper 71. Accordingly, even in a case of goods being heavier, the six-axis force sensor 62 can delete the Z-axis direction force Fz due to a gravity of the goods, and detect an external force (Fx in the embodiment) due to a person handing and receiving the goods.

<Main Controller and Memory>

Subsequently, referring to FIG. 7, the main controller 200 and the memory 300 will be described.

<Memory>

Figure 7:
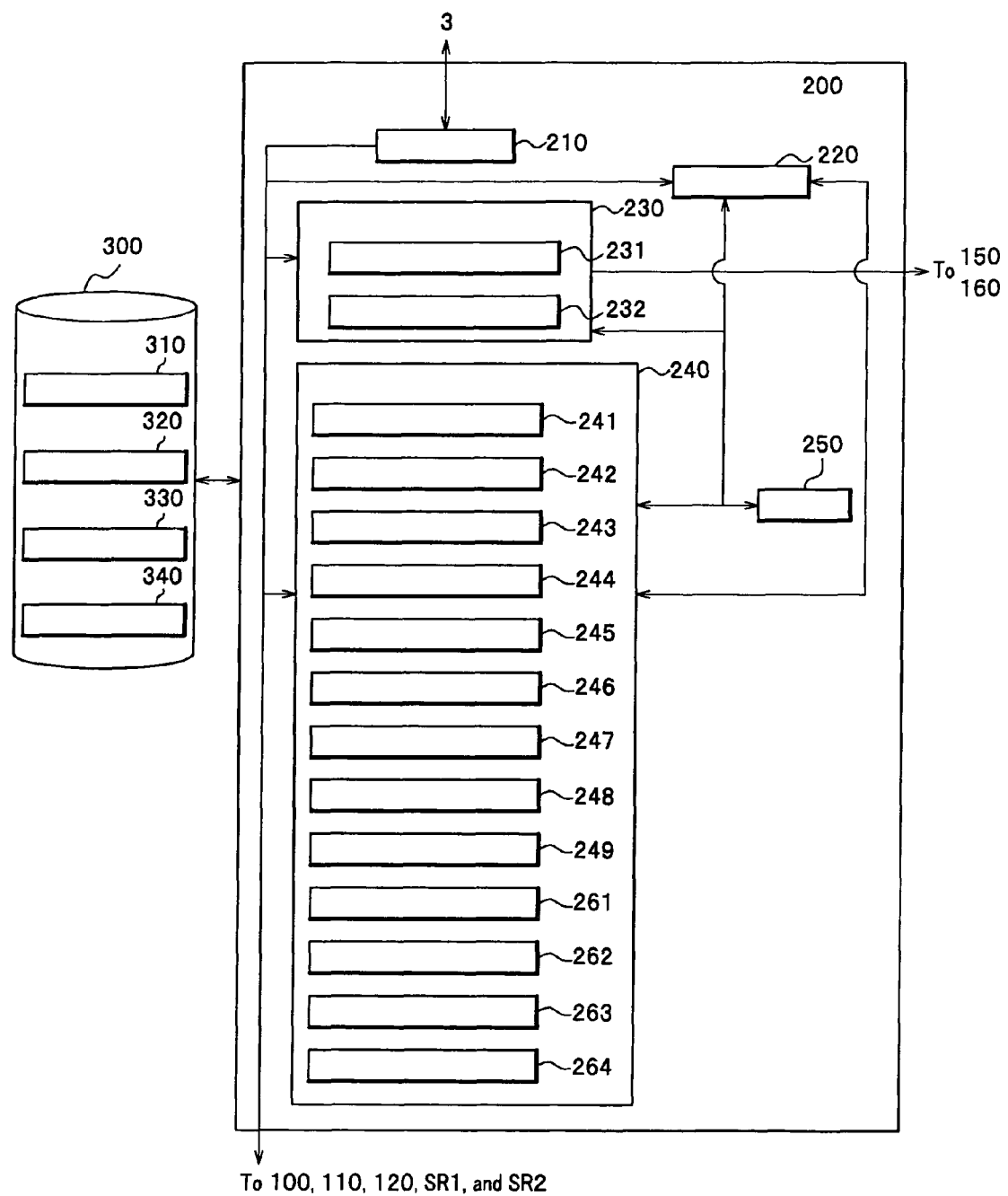
FIG. 7 is a block diagram showing a main control unit and memory unit of FIG. 4.

As shown in FIG. 7, the memory 300 comprises a personal data memory 310, a map data memory 320, a goods data memory 330, and a speech data memory 340.

The personal data memory 310 memorizes data (personal data) with respect to a person existing in an office of the task execution area EA, relating the data to a relevant person.

As the personal data is included data regarding such a personal identification (ID), a name, an affiliation, a tag identification, a normal residing place, a desk position, and a face image.

The map data memory 320 memorizes data (map data) with respect to an arrangement (such a wall position and a desk position) of the task execution area EA.

The goods data memory 330 memorizes data (goods data) with respect to goods carried by the robot R, relating the data to relevant goods.

As the goods data is included data with respect to such a goods identification, a goods name, a size, and weight.

The speech data memory 340 memorizes data (speech data) for the robot R speaking.

<Main Controller>

As shown in FIG. 7, the main controller 200 comprises a behavior control means 210, a person identifying means 220, a move behavior decision means 230, a receipt-and-handover-behavior decision means 240, and a clocking means 250.

<Behavior Control Means>

The behavior control means 210 acquires an execution order signal transmitted from the robot manager 3, and based on the signal, controls the person identifying means 220, the move behavior decision means 230 and the receipt-and-handover-behavior decision means 240.

Furthermore, the behavior control means 210 outputs to the robot manager 3 such direction data and position data of the robot R respectively detected by the gyro sensor SR1 and the GPS receiver SR2.

Furthermore, the behavior control means 210 outputs to the robot manager 3 an operation report signal for reporting a task execution situation of the robot R.

<Person Identifying Means>

The person identifying means 220 identifies who a person (detection object) detected by the object detector 120 is, based on personal information memorized in the personal data memory 310 and a tag identification of the tag T acquired by the detector 120. Because in the personal data memory 310 are memorized a name of the person and the tag identification of her/his unique tag T with being related to each other, the person identifying means 220 can determine whether or not she/he existing in a vicinity of the robot R is the person related to an task execution by referring these pieces of data and the task execution order.

<Move Behavior Decision Means>

The move behavior decision means 230 decides a content of an autonomous move, and comprises a move route decision unit 231 and a receipt-and-handover-position decision means 232.

The move route decision unit 231 decides a move route of the robot R, based on a task execution order signal, position data and direction data of the robot R, personal data, and map data.

The receipt-and-handover-position decision means 232 decides a receipt-and-handover position of the robot R, based on position data of a movable body (person) detected by the movable body extraction unit 102.

If the receipt-and-handover-position decision means 232 decides a receipt-and-handover position, the move route decision unit 231 decides a move route of the robot R so that the robot R moves to the move route. The receipt-and-handover position is a position where goods is preferably received and handed between the robot R and a person, and is decided using a distance a1 (see FIG. 12) set in advance.

<Receipt-and-Handover-Behavior Decision Means>

The receipt-and-handover-behavior decision means 240 decides a content of a behavior (movement) of the gripper 71 accompanied with a goods carrying operation, and comprises a receiving method decision means 241, a receipt-and-handover-height decision means 242, a receiving-start determination means 243, a receiving-movement-completion determination means 244, a grip-success-or-not determination means 245, a handing-start determination means 246, a handing-movement-completion determination means 247, a carrying-state setting determination means 248, a learning-degree determination means 249, a grip position recognition means 261, a grip control means 262, a gripper move means 263, and a placement-success-or-not determination means 264.

The receiving method decision means 241 decides a receiving method, based on an execution order signal, and goods data memorized in the goods data memory 300. As a receiving method selectable by the robot R of the embodiment, there exist two kinds: one hand receiving and two-hands receiving.

The one hand receiving is a receiving method of the one gripper 71R (or 71L) of the robot R receiving goods. The two-hands receiving is a receiving method of the both grippers 71R, 71L of the robot R receiving goods. The receiving method decision means 241 selects one of the two kinds, based on a size and weight of goods. For example, it can be thought that: in a case of receiving goods of a size receivable by both hands such as a document of an A4 size, the both hands receiving is selected; and in a case of receiving goods of a smaller size not receivable by both hands, the one hand receiving is selected.

<Receipt-and-Handover-Height Decision Means>

In a case of an object of a receipt-and-handover movement being a person, the receipt-and-handover-height decision means 242 decides a holding-out height a3 (see FIG. 15) of the gripper 71, based on her/his stature calculated by the movable body extraction unit 102. The holding-out height a3 is a height where goods is preferably received and handed between the robot R and a person, and one of three heights set in advance is selected, based on her/his stature calculated.

Figure 14:
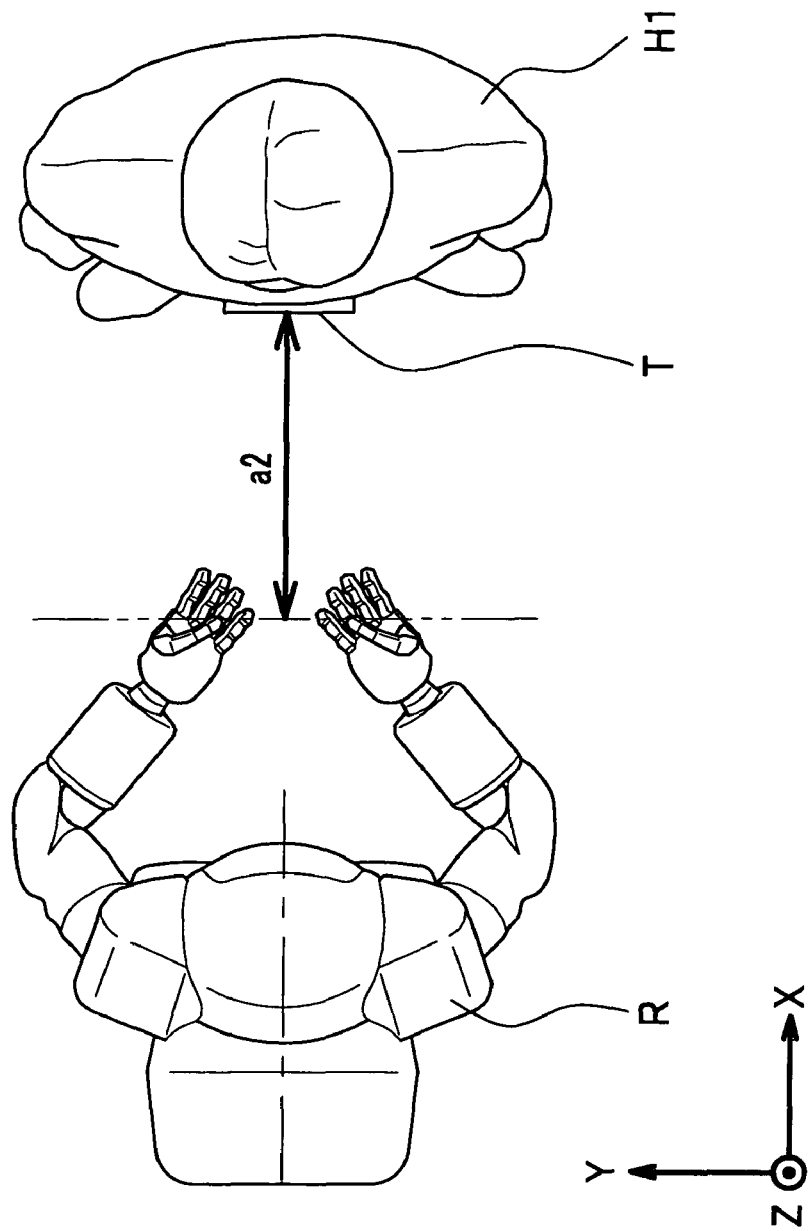
FIG. 14 is a plan view showing a state of the robot in FIG. 1 holding out a gripper at a receiving height.
Figure 15:
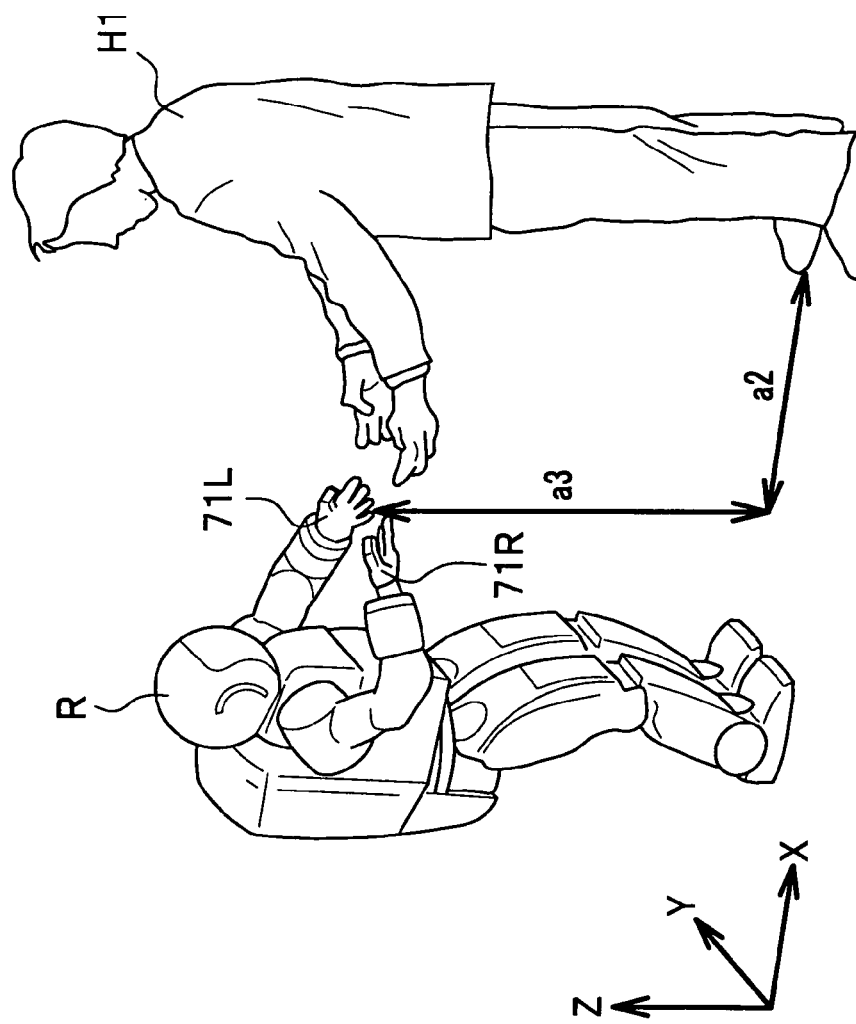
FIG. 15 is a drawing showing a state of the robot in FIG. 1 holding out a gripper at a receiving height.

Then the receipt-and-handover-height decision means 242 makes the robot R hold out the gripper 71 to the height a3 through the autonomous mobile controller 150, and so that a distance from the person to the gripper 71 becomes a distance a2 and further so that the gripper 71 is matched with her/his center line (central vertical line) calculated by the movable body extraction unit 102 (see FIGS. 14, 15).

<Receiving-Start Determination Means>

The receiving-start determination means 243 makes the gripper 71 start a receiving movement in a case of: a person holding out goods to a position receivable by the robot R; and the robot R determining whether or not the receiving movement can be started and having determined that the receiving movement can be started.

In a state of the gripper 71 having not gripped goods, in detail in a receipt waiting state described later, when the X-axis force Fx detected by the six-axis force sensor 62 is not less than a predetermined Fx1 (first predetermined value), the receiving-start decision means 243 determines that a receiving movement can be started, drives the gripper 71 through the gripper controller 160, and makes the unit 71 start a fingers closing movement.

The above is control of utilizing the fact that a person intending to hand goods to the robot R pushes the goods to the hand 72.

<Receiving-Movement-Completion Determination Means>

The receiving-movement-completion determination means 244 determines whether or not a receiving movement is completed in a state of the gripper 71 being receiving goods.

The receiving-movement-completion determination means 244 determines that a receiving movement is completed in a case of the X-axis force Fx detected by the six-axis force sensor 62 having become not more than a predetermined value Fx2 (second predetermined value; Fx2≦Fx1).

The above is control of utilizing the fact that a force by which goods is pushed to the hand 72 is reduced when a person intending to hand the goods to the robot R releases her/his hand, determining that the robot R has received the goods.

Furthermore, in a receipt waiting state, when an opening of the gripper 71 becomes not more than a predetermined value, that is, when the grip angle deviation θ becomes not more than a predetermined value θ1 (third predetermined value) (for example, θ=0), the receiving-movement-completion determination means 244 determines that the receiving movement is completed.

In a case of determining that a receiving movement is completed, the receiving-movement-completion determination means 244 drives the gripper 71 through the gripper controller 160, generates a torque in the fingers closing direction, and makes the gripper 71 grip the goods.

<Grip-Success-or-Not Determination Means>

The grip-success-or-not determination means 245 determines whether or not gripping goods is successful.

In the embodiment the grip-success-or-not determination means 245 makes the grippers 71R, 71L approach or separate each other through the arm controller 152 in a case of the both-hands receiving being performed. Then the grip-success-or-not determination means 245 determines whether or not both of the grippers 71R, 71L have gripped goods, based on the reaction force Fy from the goods detected by the six-axis force sensor 62.

The grip-success-or-not determination means 245 determines that gripping goods is successful in a case of the reaction force Fy from the goods is not less than a predetermined value.

<Handing-Start Determination Means>

The handing-start determination means 246 determines whether or not a person intends to receive goods in a state of the robot R having held out the goods to a position receivable by her/him, and makes the gripper 71 start a handing movement in a case of determining that she/he intends to receive the goods.

In a handover waiting state described later, when the X-axis force Fx detected by the six-axis force sensor 62 is not less than a predetermined value Fx3, the handing-start determination means 246 determines that the handing movement can be started, drives the gripper 71 through the gripper controller 160, and makes the gripper 71 perform a fingers opening movement.

The above is control of utilizing the fact that a person intending to receive goods from the robot R pulls the goods.

Furthermore, in a handover waiting state, when an opening of the gripper 71 becomes not more than a predetermined value, that is, when the grip angle deviation θ becomes not more than a predetermined value θ2 (for example, θ=0), the handing-start determination means 246 determines that the handing movement can be started.

The above is control of utilizing the fact that a person intending to receive goods from the robot R pulls the goods, thereby the goods is removed from the gripper 71, and that thus the unit 71 closes by a grip torque.

<Handing-Movement-Completion Determination Means>

In a handover waiting state described later, when the X-axis force Fx detected by the six-axis force sensor 62 is not more than a predetermined value Fx4 (Fx4≦Fx3), the handing-movement-completion determination means 247 determines that the handing movement is completed.

The above is control of utilizing the fact that the external force Fx generated at the gripper 71 due to goods becomes smaller by a person completely receiving the goods.

<Carrying-State Setting Means>

The carrying-state setting means 248 detects a state of the gripper 71, and sets and updates the state.

As the state of the gripper 71 there are following ones:

1: Free, a state of a goods carrying task not being requested

2: Waiting for receiving, a state of a robot holding out a gripper and waiting for a person handing goods 3: Receiving, a state of a person handing goods and a robot receiving goods 4: Receiving movement completion, a state of a person releasing her/his hand from goods and the goods having (seeming to have) been handed to a robot 5: Grip-success or not determination, a state of a robot determining whether or not gripping goods is successful 6: Receipt failure, a state of a robot having failed to receive goods 7: Grip completion, a state of a robot having succeeded in receiving goods and having gripped the goods 8: Waiting for handover, a state of a robot having held out a gripper and waiting for a person receiving goods 9: Handing over, a state of a person having received goods and the goods being handed 10: Handing completion, a state of a person having completely received goods and the goods having been handed to her/him 11: Error, such a state of goods being dropped during being carried <Learning-Degree Determination Means>

The learning-degree determination means 249 determines a learning degree of a person with respect to a receipt-and-handover movement.

The learning-degree determination means 249 measures a time required for shifting from the receipt waiting state to the during-receiving state, and a time required for shifting from the handover waiting state to the during-handing state, using the clocking means 250 of a clock provided within the main controller 200. Then based on a length of the measured time, the learning-degree determination means 249 determines the learning degree of a person. Here, in order of a shorter time the learning degree is determined to be high, middle, and low.

<Grip Position Recognition Means>

The grip position recognition means 261 recognizes a portion suitable for gripping goods of a gripped object from its image in order to enable a gripping movement of an image recognition being main.

<Grip Control Means>

The grip control means 262 performs control of driving the gripper 71 to a predetermined grip position (predetermined position) of a carrier container and gripping the predetermined position.

<Gripper Move Means>

The gripper move means 263 moves any one of gripped goods and a gripped carrier container to a target position obtained from a height of a placement place.

<Placement-Success-or Not Determination Means>

The placement-success-or-not determination means 264 determines whether or not the gripper 71 is lowered to a predetermined height before a placement of any one of goods and a carrier container is completed. In a case of the gripper 71 being lowered to the predetermined height, the placement-success-or-not determination means 264 determines that the placement has failed.

The gripper controller 160 sets speeds of fingers closing and opening movements, based on the learning degree. In other words, in a case of the robot R performing a receipt-and-handover movement for a person determined to be low in the learning degree, the gripper controller 160 makes the gripper 71 slowly perform the fingers closing and opening movements, and is adapted not to give a sense of uneasiness to her/him.

Furthermore, in a case of the robot R performing a receipt-and-handover movement for a person determined to be high in the learning degree, the gripper controller 160 makes the gripper 71 swiftly perform the fingers closing and opening movements, and is adapted not to give a botheration to her/him.

Furthermore, the receipt-and-handover-behavior determination means 240 decides a speech behavior, based on the learning degree, and makes the speaker S speak, based on speech data.

<Movement Example of Robot>

Subsequently will be described a goods carrying movement of the robot R according to a preferred embodiment of the present invention. Here will be described, as an example, a case of receiving an execution order signal with respect to such a task that the robot R "acquires a carrier container of a predetermined specification, where goods is housed from an acquisition source, and delivers the container to a destination."

Figure 8A:
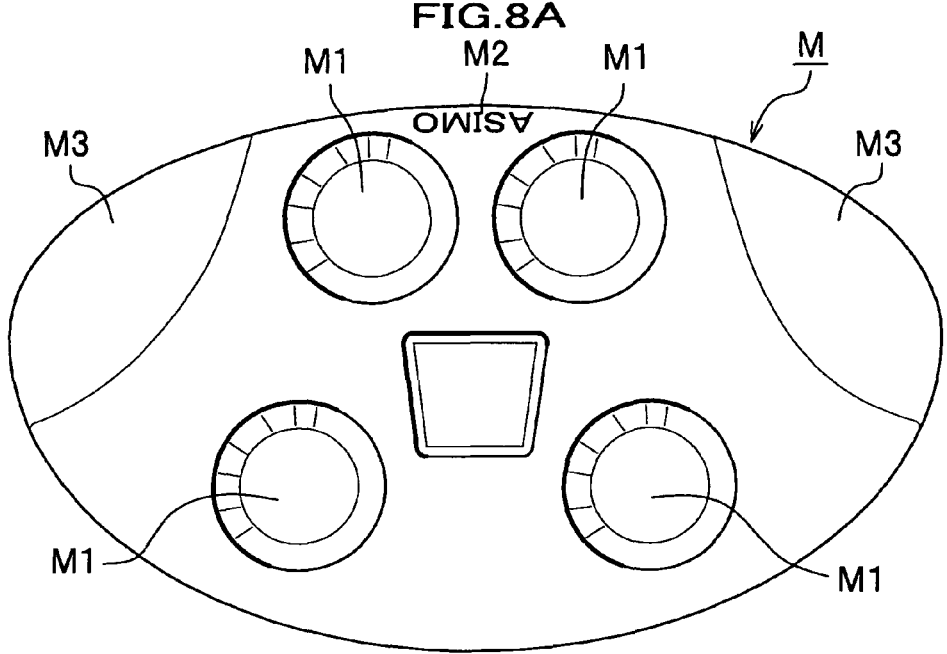
FIGS. 8A to 8C are drawings showing a carrier container used in carrying goods according to the present invention.
Figure 8B:
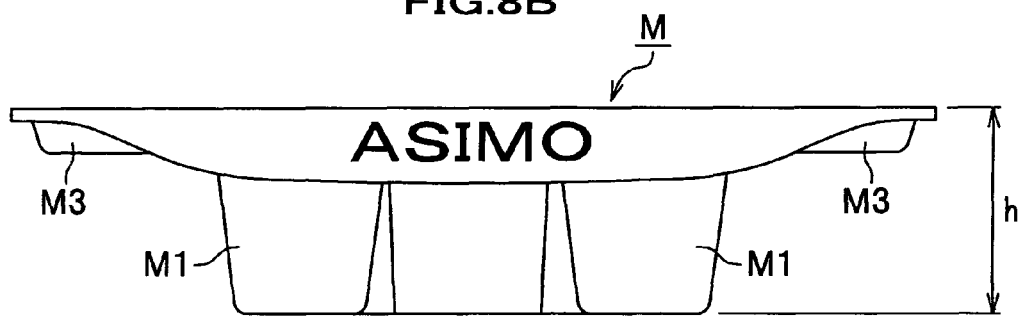
Figure 8C:
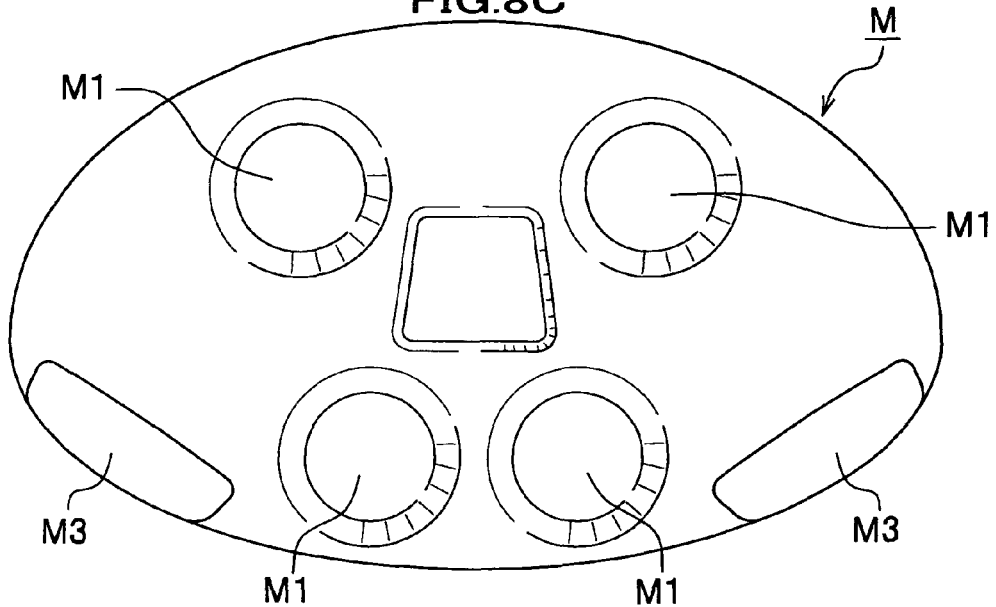

In accordance with the present invention, goods is carried on a carrier container such as a tray or housed therein. FIGS. 8A to 8C are drawings showing one example of a carrier container used in carrying goods according to the present invention; FIG. 8A is a view seen from a top side of a carrier container M; FIG. 8B is a view of the container M seen from an arrow SP direction; and FIG. 8C is a view of the container M seen from a back side. In FIGS. 8A to 8C the container M has a concave portion M1 for putting or housing one of goods and a goods container, and thereby, is considered so that the goods is not vibrated and slid during being carried. Furthermore, the carrier container M preferably has a shape suitable for being gripped by the gripper 71 of the robot R. For example, in the example of FIGS. 8A to 8C, as shown in FIG. 8A, the top surface of the carrier container M is processed so that the first finger 73 corresponding to a thumb does not slide; as shown in FIG. 8C, the back surface of the container M has a convex shape where the second finger 74 is easily hooked.

Furthermore, on the top surface of the carrier container M is added a predetermined image recognition pattern M2 so that the robot R can easily recognize the container M in its image. In the example of FIGS. 8A to 8C, although a logo of "ASIMO" of a robot name of our company is added as the predetermined pattern M2, the pattern M2 is not limited thereto; if it has a color different from that of a base of the carrier container M, any of an arbitrary mark and pattern with an arbitrary color is available. A color of the carrier container M is preferably different from a surface color of the storage spaces B and C1 to C3 where the container M is placed, and moreover, from a viewpoint of a gripping movement, is preferably different from a color of the gripper 71, too.

Figure 9:
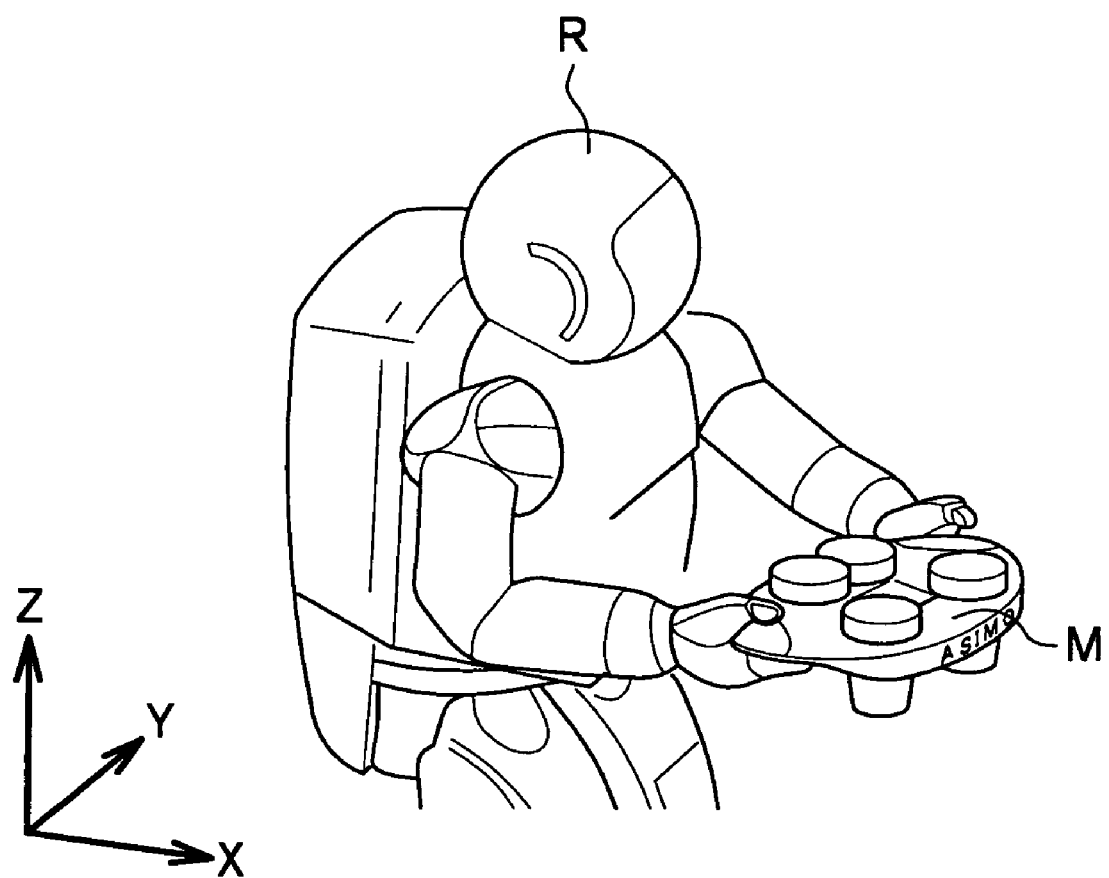
FIG. 9 is a perspective view showing a manner of the robot in FIG. 1 having the carrier container.

Moreover, a height h of a grip portion of the carrier container M is preferably higher than a thickness of the second finger 74 of the gripper 71. In FIG. 9 is shown one example of a state of the robot R having gripped the carrier container M.

In addition, in a description below, because a tray as an example for carrying a beverage is described as the carrier container M, the container M is also alternatively called "tray M".

Hereafter will be sequentially described an acquisition position move movement of moving to an acquisition source of the carrier container M, an acquisition movement of acquiring the container M from the acquisition source, a carrying movement of gripping the acquired container M and carrying to a destination, and a placement movement of placing the container M on a goods storage space of the destination.

<Acquisition Position Move Movement>

Figure 10:
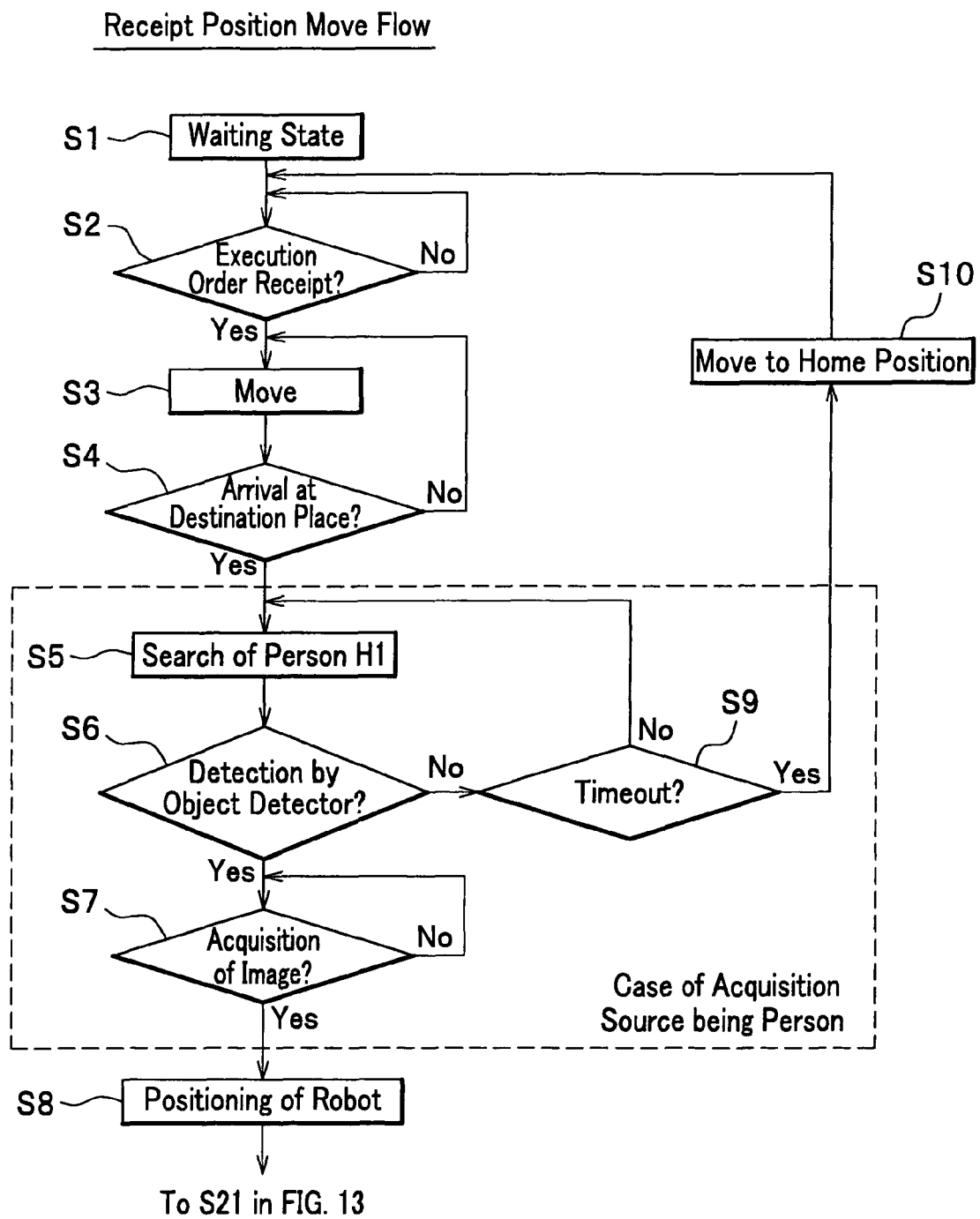
FIG. 10 is a flowchart showing a goods carrying operation according to a robot control system with respect to an embodiment of the present invention and showing a movement to an acquisition position in a case of an acquisition source being a person.

As shown in FIG. 10, the robot R firstly waits at a home position set in the task execution area EA (step S1).

If receiving an execution order signal transmitted from the robot manager 3 (Yes in a step S2), the robot R starts moving to a normal residing place (hereinafter referred to as "normal residing place P1") of a person H1 from the home position (step S3). Then if arriving at the normal residing place P1 of the person H1 (Yes in a step S4), the robot R stops moving and starts searching the person H1 (step S5).

Figure 12:
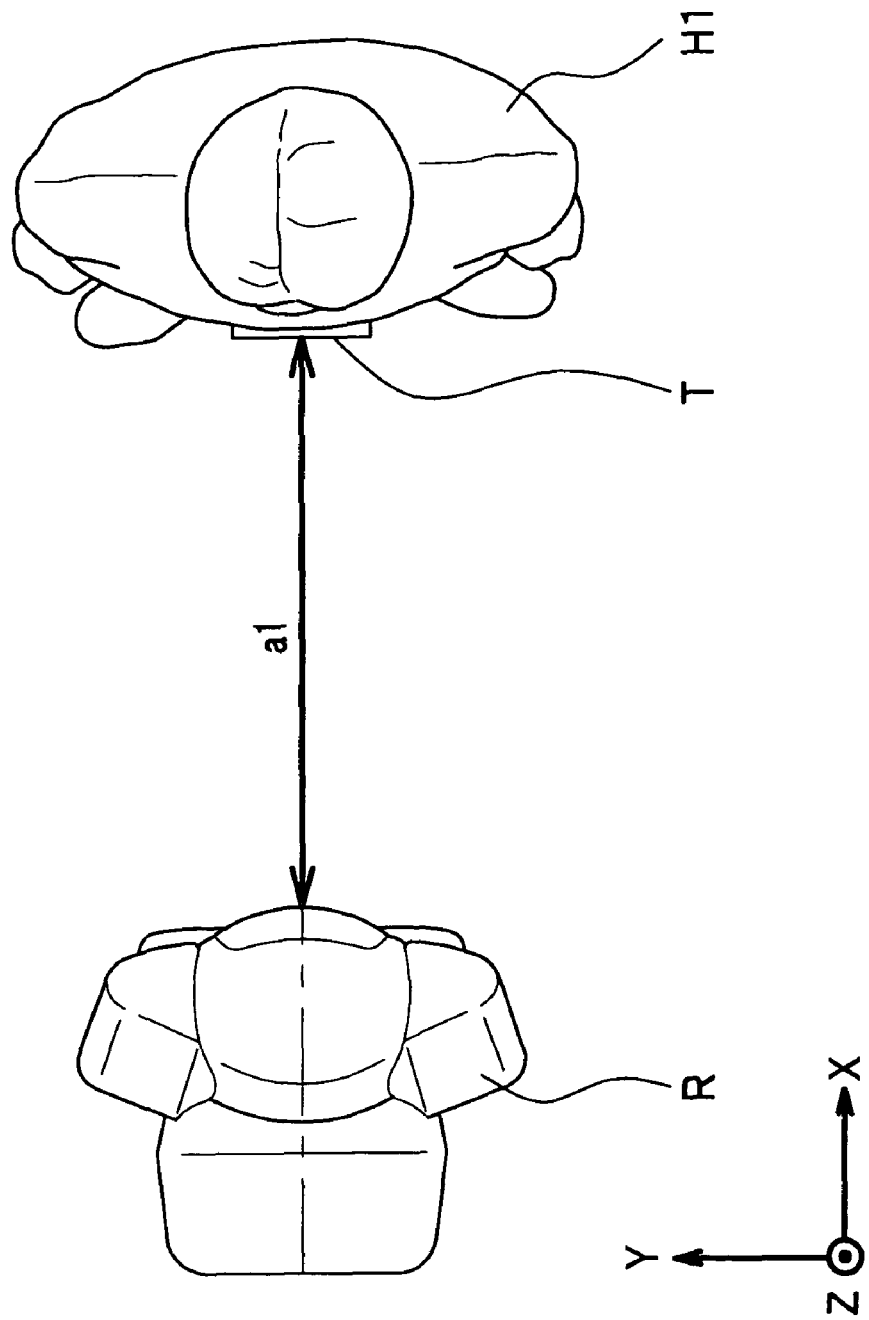
FIG. 12 is a drawing showing a state of the robot in FIG. 1 having moved to a receipt position (in a case of the acquisition source being a person).

If detecting a tag identification of the person H1 by the object detector 120 (Yes in a step S6), the robot R acquires her/his image by the cameras C, C (Yes in a step S7), moves to her/his front as shown in FIG. 12 (step S8). In FIG. 12 is shown a state of the robot R having moved to a receipt position decided by the receipt-and-handover-position decision means 232.

In addition, in a case of the object detector 120 being unable to having detected the tag identification of the person H1 within a predetermined time (Yes in a step S9), the robot R generates an operation report signal of informing of being unable to execute the task by the behavior control means 210, outputs the signal to the robot manager 3, and moves to the home position (step S10).

Figure 11:
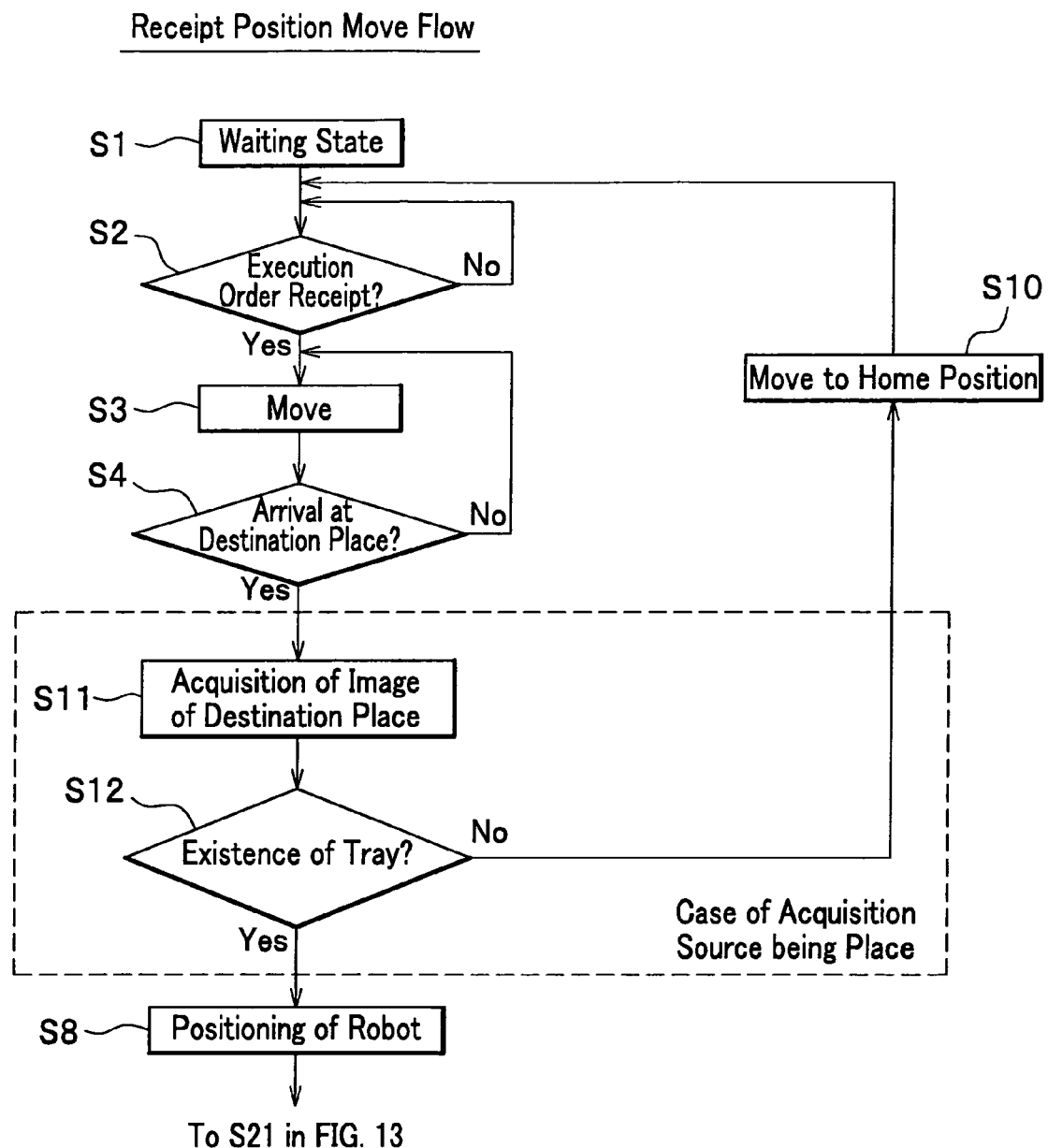
FIG. 11 is a flowchart showing a goods carrying operation according to the robot control system with respect to the embodiment of the present invention and showing a movement to an acquisition position in a case of the acquisition source being a place.

Furthermore, FIG. 11 is a flowchart showing a move to an acquisition position in a case of an acquisition source being a place. Because the flowchart of FIG. 11 is the same as that of FIG. 10 except that a broken line block of the latter is replaced with steps S11 and S12, only a difference thereof will be described. In FIG. 11, subsequently to the step S4, the robot R acquires an image of a destination place (for example, such the C1 in FIG. 1) in the step S11, and determines whether or not there exists the tray M in the determination step S12. If there exists the tray M (Yes in the step S12), the processing proceeds to the step S8; if not, the processing proceeds to the step <Acquisition Movement>

Subsequently will be described an acquisition movement of the robot R. As an acquisition source of goods is available any one of a goods storage space (for example, the B1 in FIG. 1) such as a table and a person.

The robot R having moved to an acquisition position holds out, as shown in FIGS. 14, 15, the grippers 71 (71R, 71L) in a fingers opened state to a receiving height decided by the receipt-and-handover-height decision means 242 (step S21).

As shown in FIGS. 14 and 15, the robot R holds out the grippers 71 (71R, 71L) to the height a3 decided by the receipt-and-handover-height decision means 242, and so that a distance to the grippers 71 (71R, 71L) from the person H1 becomes the distance a2. Moreover, the robot R matches the holding-out direction of the grippers 71 (71R, 71L) with the center line (central vertical line) of the person H1 calculated by the movable body extraction unit 102.

If holding out the grippers 71 (71R, 71L) is completed, the carrying-state setting means 248 sets a carrying state as "receipt waiting," and prompts to hand the carrier container M by the robot R speaking, for example, "Please hand the tray M" and the like (step S22).

Then in a step S23 the carrying-state setting means 248 checks a position of the carrier container M, and in a step S24, determines whether or not a position change of the container M is smaller than a predetermined value. According to the determination, the carrying-state setting means 248 determines whether the person H1 is on the way of holding out the tray M or in a state of an approximately stopped state, holding out the tray M to a certain position. In a case of the position change being larger than the predetermined value in the step S24 (No), the carrying-state setting means 248 determines that the robot R is the holding-out underway, and the processing returns to the step S23. In a case of the position change being smaller than the predetermined value in the step S24 (Yes), the carrying-state setting means 248 determines that the holding-out movement of the person H1 is approximately completed, and the processing proceeds to a step S25.

Figure 16:
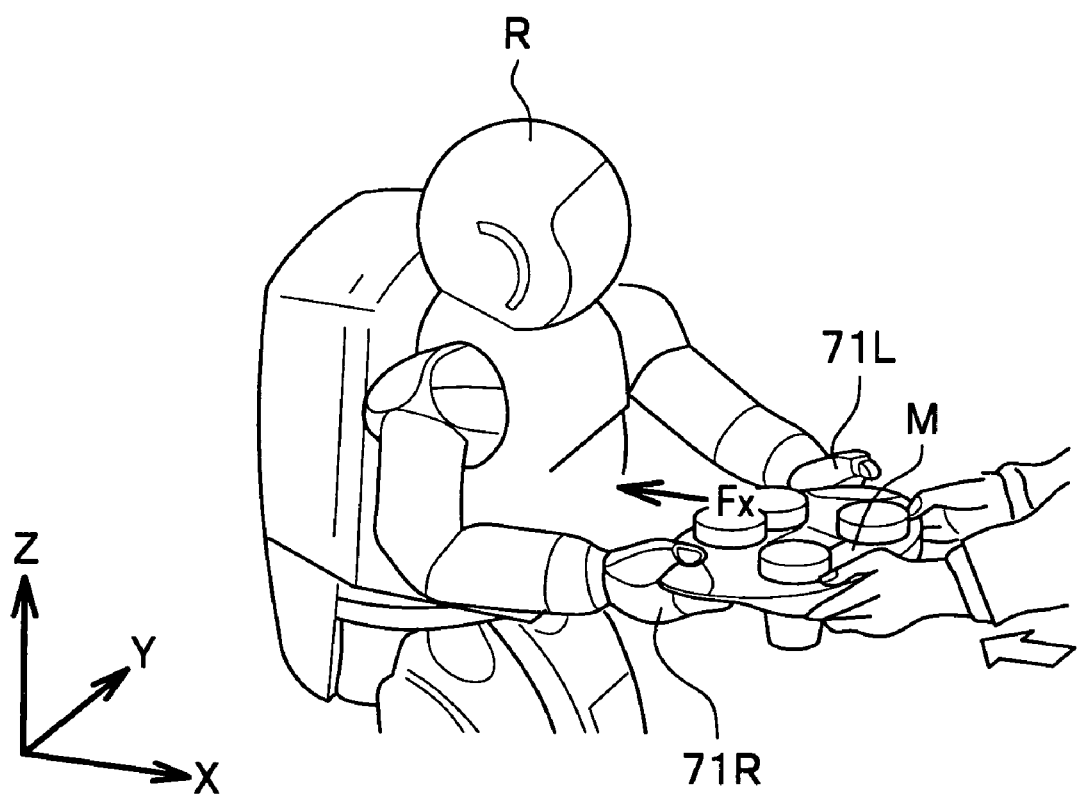
FIG. 16 is a drawing showing a state of the robot in FIG. 1 having started receiving goods.

The grip position recognition means 261 recognizes in image the grip portion M3 of the tray M (step S25); the grip control means 262 moves the gripper 71 to the portion M3 of the tray M, and in a step S26, determines whether or not the detection values Fx and Fy of the six-axis force sensors 62R, 62L are larger than the respective predetermined values Fx1 and Fy1. If not larger (No in the step S26), the grip control means 262 determines that the gripper 71 has not touched the grip portion M3 of the tray M, and the processing returns to the step S25. In a case of Yes in the step S26, the grip control means 262 determines that the gripper 71 has touched the grip portion M3 of the tray M, and the processing proceeds to a step S27; the carrying-state setting means 248 sets the carrying state as "receiving underway," and the robot R starts closing the grippers 71R, 71L. In FIG. 16 is shown a state of the robot R having started receiving the tray M.

Figure 17:
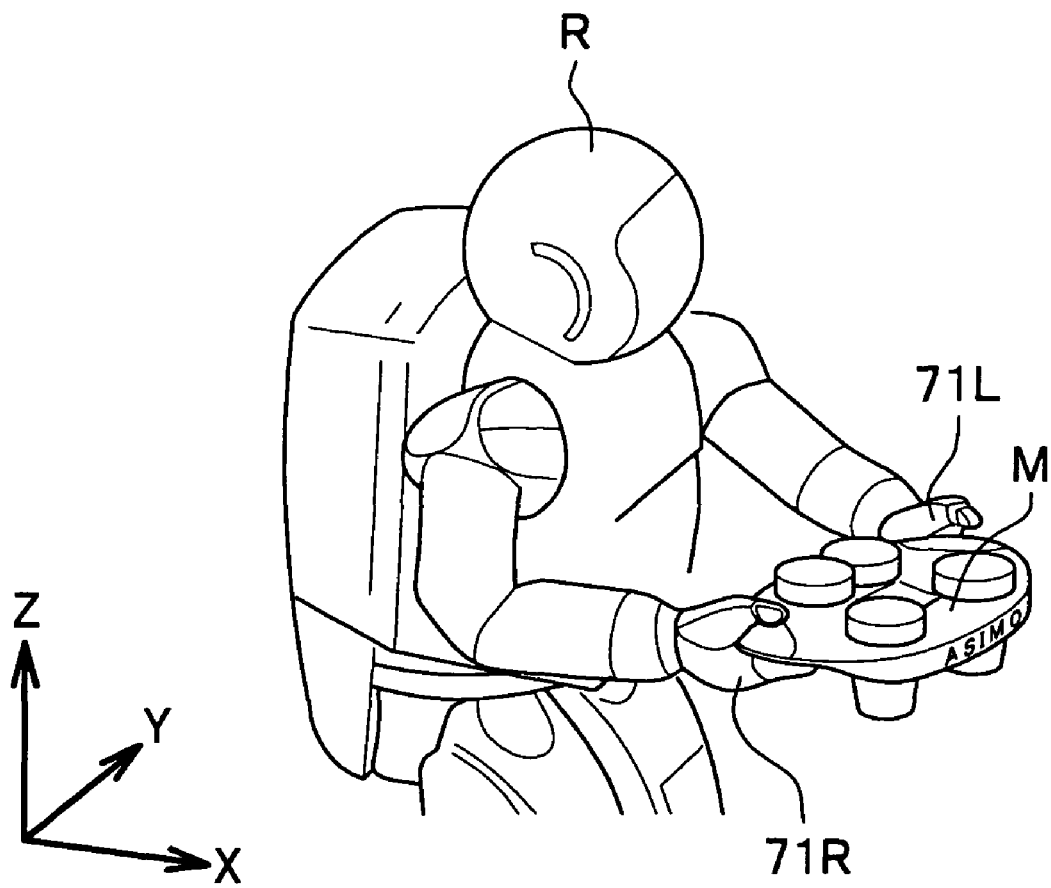
FIG. 17 is a drawing showing a state of the robot in FIG. 1 having completed receiving the goods.

Then in the state during receiving, if the force Fx which the robot R detects with the six-axis force sensors 62R, 62L becomes not more than the Fx2 or the grip angle deviation θ becomes not more than the θ1 (Yes in a step S28), the carrying-state setting means 248 sets the carrying state as "receiving movement completion" (step S29), and as shown in FIG. 17, the grippers 71R, 71L grip the tray M.

Subsequently, the grip-success-or-not determination means 245 determines an opening of the grippers 71R, 71L (step S30).

In a case of both openings of the grippers 71R, 71L, that is, the grip angle deviation θ being not less than (condition D1) a predetermined value θ3 (fourth predetermined value), the grip-success-or-not determination means 245 determines that the tray M is thicker and both of the grippers 71R, 71L have gripped the tray M; the carrying-state setting means 248 sets the carrying state as "grip completion" (step S31).

In a case of the grip angle deviation θ of at least one of the grippers 71R, 71L being less than (condition D2) a predetermined value θ3, the carrying-state setting means 248 sets the carrying state as "grip-success-or-not determination" (step S32), the grip-success-or-not determination means 245 determines whether or not the gripping is successful (step S33).

In detail the robot R makes the grippers 71R, 71L approach or separate each other, and detects with the six-axis force sensors 62R, 62L the reaction force Fy acting from the tray M. In a case of the reaction force Fy being not less than (condition D3) the predetermined value Fy1, the grip-success-or-not determination means 245 determines that the gripping is successful; the carrying-state setting means 248 sets the carrying state as "receiving movement completion"; and the grippers 71R, 71L grip the tray M.

Furthermore, in a case of the reaction force Fy being less than (condition D4) the predetermined value Fy1, the grip-success-or-not determination means 245 determines that the gripping is unsuccessful; the carrying-state setting means 248 sets the carrying state as "receipt failure."

Here will be described a grip-success-or-not determination, referring to FIGS. 18A to 18C.

As shown in FIG. 18A, in a case of both of the grippers 71R, 71L having gripped the tray M, if they approach each other, the reaction force Fy (not less than the predetermined value Fy1) (condition D3) is generated due to the tray M.

As shown in FIG. 18B, in a case of one of the grippers 71R, 71L (here, the gripper 71R) having gripped the tray M, even if they approach each other, the reaction force Fy (not less than the predetermined value Fy1) (condition D3) due to the tray M becomes an extremely small value (not less than the predetermined value Fy2 and smaller than the predetermined value F1, Fy2≦Fy<Fy1) (condition D5).

As shown in FIG. 18C, in a case of neither of the grippers 71R, 71L (here, the gripper 71R) having gripped the tray M, even if they approach each other, the reaction force Fy is not generated (Fy=0) due to the tray M.

Accordingly, in a case of the reaction force being not less than the predetermined value Fy1, the grip-success-or-not determination means 245 determines that the gripping is successful; thereby, it is possible to determine whether or not the robot R has gripped the goods with both hands (gripper 71R, 71L).

Figure 13:
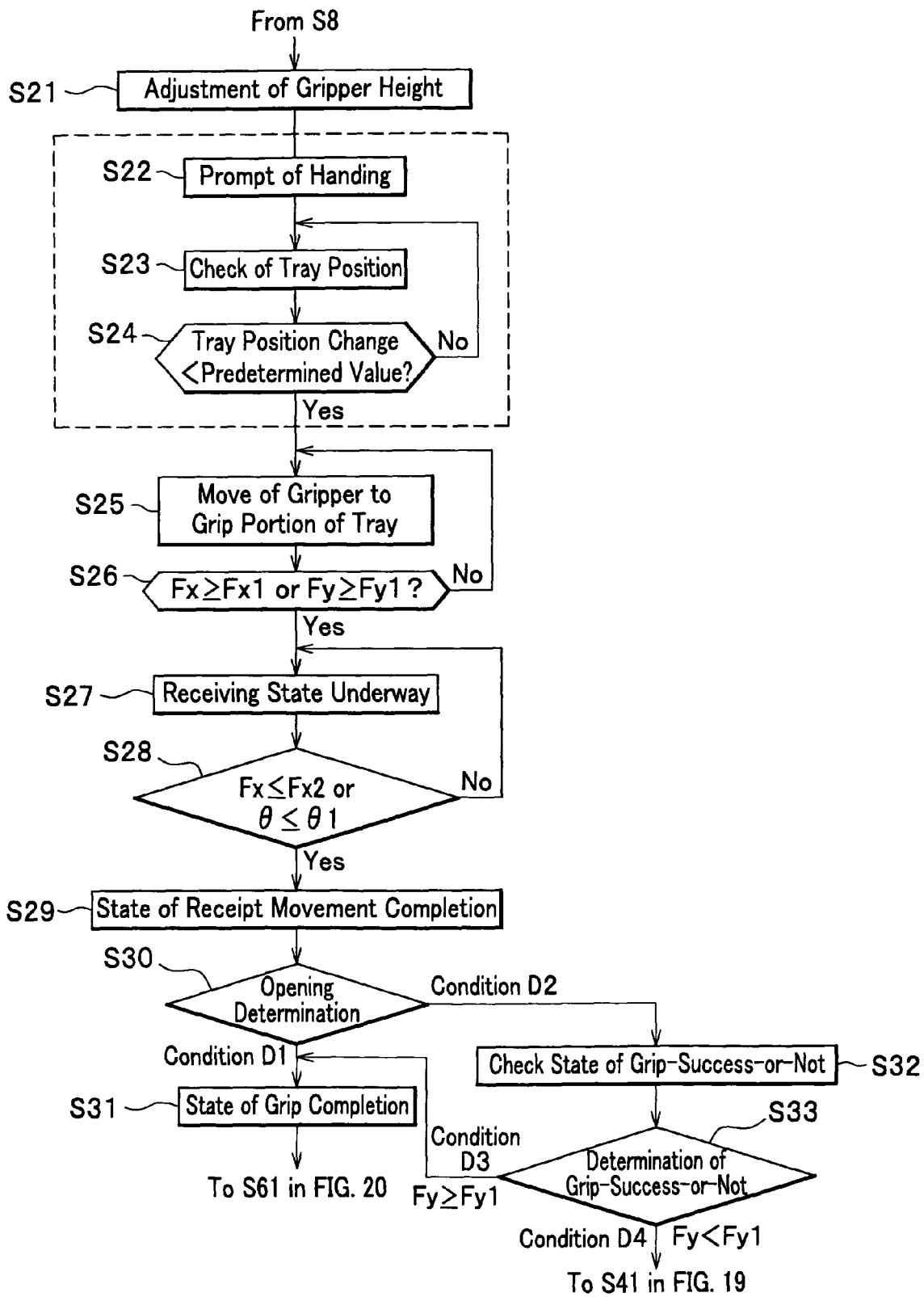
FIG. 13 is a flowchart showing a goods carrying operation according to a robot control system with respect to the embodiment of the present invention and showing a receiving movement in a case of the acquisition source being a person.

In addition, although the acquisition movement is described in a case of the acquisition source being the person H1, it is possible to apply the flowchart in FIG. 13 to a case of the acquisition source being a place such as a desk, a counter, and a table by omitting a broken line portion (steps S22 to S24) in the flowchart therein. In this case it is requested in the step S21 for the robot R to hold out the gripper 71 higher than a goods storage space of the acquisition source.

Thus in accordance with the present invention it is possible to acquire the tray M without assistance of the person H1 even if the acquisition source is any one of her/him and a place.

<Retry Receipt Preparation>

Subsequently will be described a retry receipt preparation of the robot R.

Figure 19:
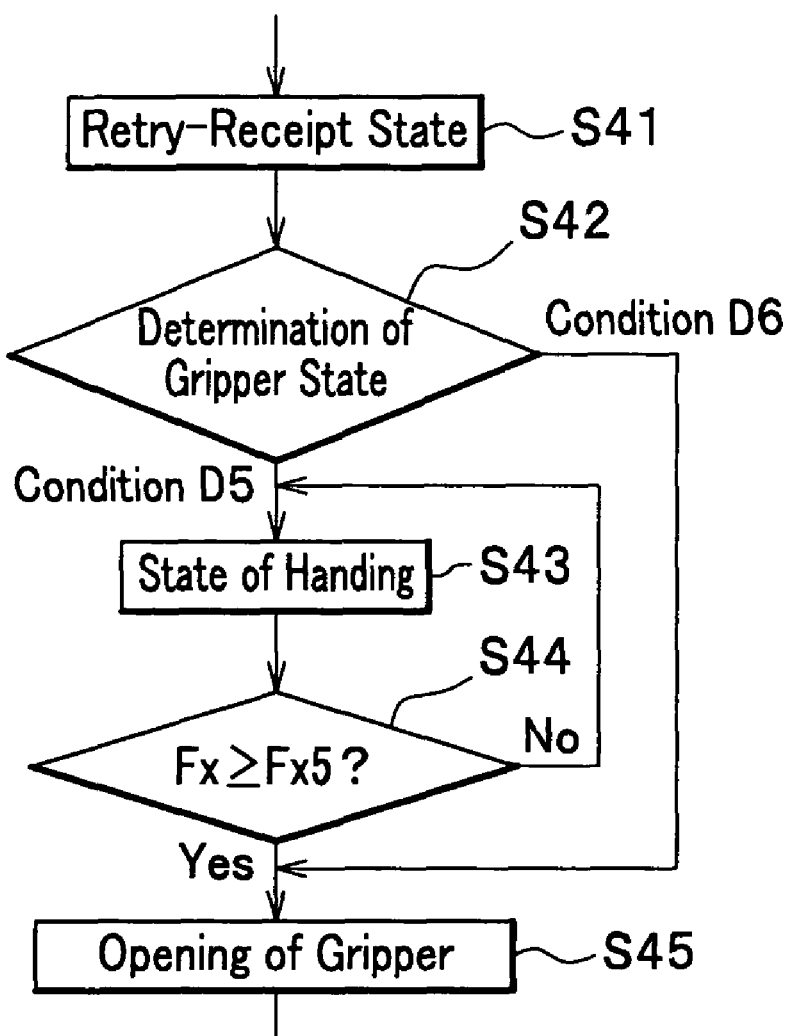
FIG. 19 is a flowchart showing a goods carrying operation according to the robot control system with respect to the embodiment of the present invention and showing a goods retry receipt preparation.

If the grip-success-or-not determination means 245 determines that the gripping is unsuccessful (condition 4 in the step S33 of FIG. 13), in FIG. 19 the carrying-state setting means 248 sets the gripper state as "receipt failure"; the gripper state becomes a retry receipt state (step S41); the means 245 determines a state of the grippers 71R, 71L (step S42). In the grip-success-or-not determination movement, in a case of at least one of the six-axis force sensors 62R, 62L having detected the external force not less than the predetermined value Fy2 (condition D5 in the step S42), the carrying-state setting means 248 sets the carrying state as "handing state" and the robot R speaks "Please receive the tray M and hand it over again" (step S43).

Then if the robot R detects the external force Fx not less than a predetermined value Fx5 by one having gripped the tray M out of the six-axis force sensors 62R, 62L (Yes in the step S44), the carrying-state setting means 248 sets the carrying state as "handing underway" and the grippers 71R, 71L are opened (step S45). Thereafter the processing moves to the step S22, and the receipt movement is retried.

In addition, in the step S42 and in the grip-success-or-not determination movement, if the grip angle deviation θ of the grippers 71R, 71L is not more than a predetermined value θ4 (for example, θ=0) (condition D6), the robot R speaks "Please hand the tray M again," and the grippers 71R, 71L are opened (step S45). Thereafter the processing moves to the step S22 in FIG. 13, and the receipt movement is retried.

<Carrying Movement>

Subsequently will be described a goods carrying move of the robot R.

Figure 20:
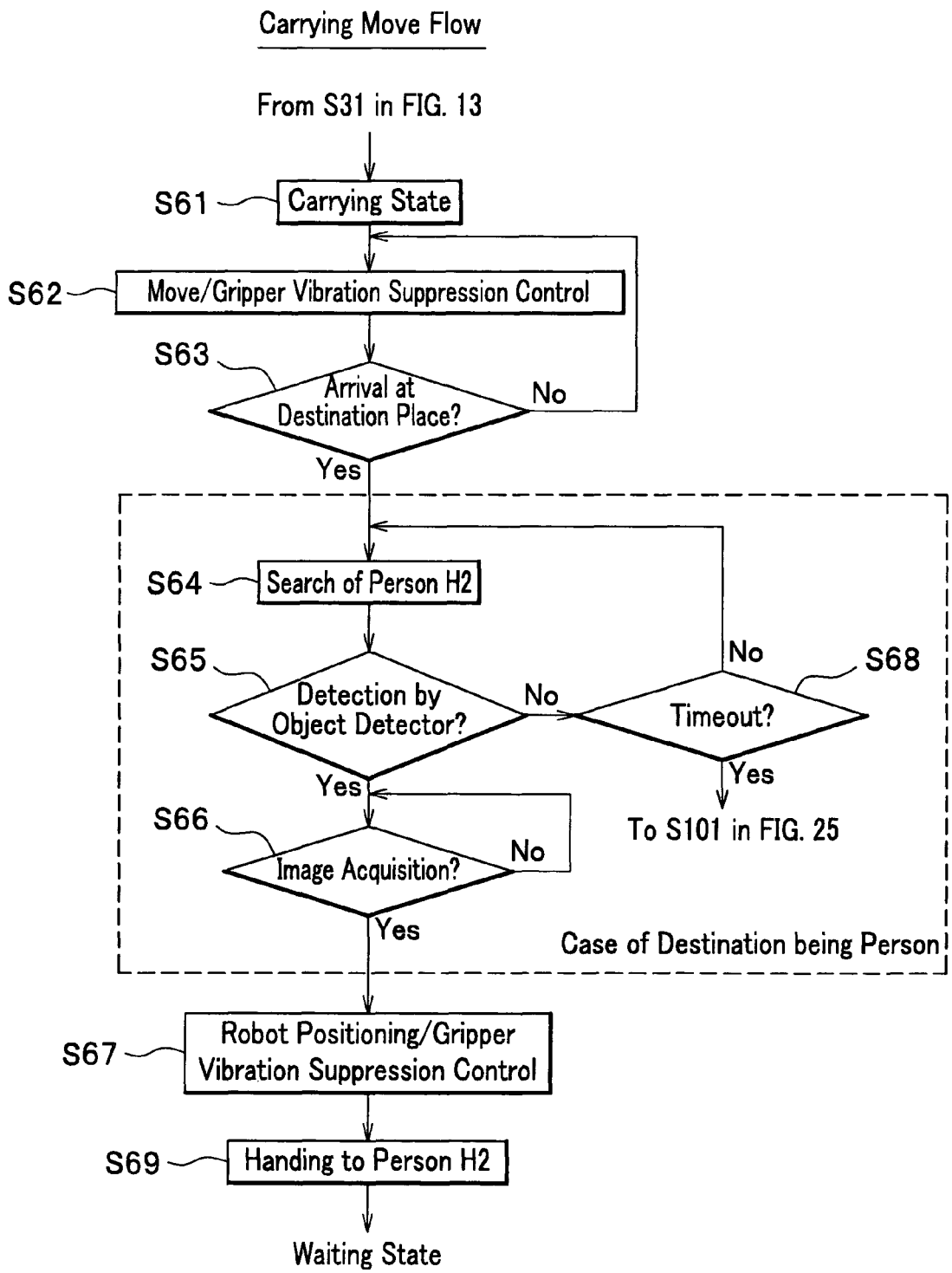
FIG. 20 is a flowchart showing a goods carrying operation according to the robot control system with respect to the embodiment of the present invention and showing a carrying movement in a case of a destination being a person.

In the step S 28 (FIG. 13), if the goods gripping is completed, in FIG. 20 the robot R moves the grippers 71R, 71L to a position (dead angle) deviated from an image region taken by the cameras C, C (step S61). This is in order to prevent the gripped tray M from blocking a view of the cameras C, C.

In a move/gripper vibration suppression control step the robot R starts carrying from a receipt position to a normal residing place of a person H2 (hereinafter referred to as "normal residing place P2") (step S62). Then the robot R continues the carrying until arriving at the normal residing place P2 of the person H2 (as far as a step S63 is "No").

In accordance with the present invention, in a case of moving in a state of gripping any one of goods and the tray M (that is, during goods carrying), the robot R performs vibration suppression control for suppressing a vibration of the gripper 71. Therefore, at a proper timing (for example, such the step S21 in FIG. 21), the robot R memorizes detection values Fx0, Fy0, Fz0, Mx0, My0, and Mz0 of the six-axis force sensors 62R, 62L (these are tentatively referred to "calibration value") in a state of not gripping goods and in a pose of gripping the arms R3 and carrying. Moreover, for example, in the step S31 where the gripping is completed, the robot R memorizes the detection values Fx1, Fy1, Fz1, Mx1, My1, and Mz1 of the six-axis force sensors 62R, 62L (these are tentatively referred to "goods weight addition value") in a state of gripping any one of goods and the tray M housing the goods and of being stationary.

Figure 22:
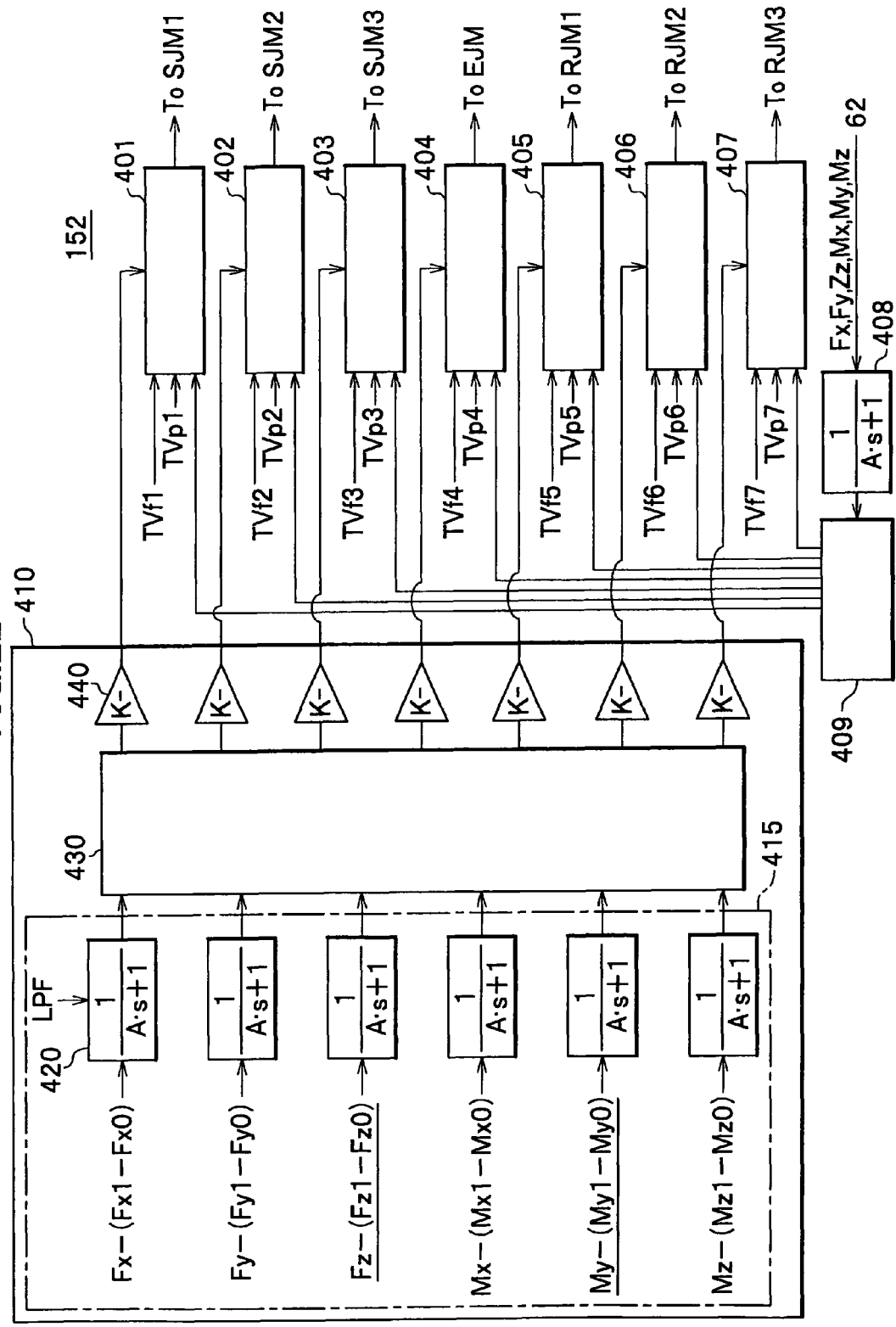
FIG. 22 is a schematic block diagram showing a configuration example of an arm control unit having a vibration suppression function of a gripper according to the embodiment of the present invention.

Although the robot R comprises arm controllers 152R, 152L of a same structure with respect to left and right arms, each of the controllers 152R, 152L is simply referred to as "arm controller 152." Generally, each of the left and right arms R3 comprises total seven pieces of not shown actuators: three at a shoulder joint (SJ), one at an elbow joint (HJ), and three at a wrist joint (RJ); that is, shoulder joint motors SJM1 to SJM3, an elbow joint motor HJM, and wrist joint motors RJM1 to RJM3. In FIG. 22 the arm controller 152 comprises controller-and-drivers 401 to 407 respectively provided for the seven not shown motors SJM1 to SJM3, the HJM1 and RJM1 to RJM3 configuring the arms R3 controlled by the unit controller 152; six low pass filters (1/(A*S+1)) 408 (A, arbitrary time constant) for respectively passing the six detection values Fx, Fy, Fz, Mx, My, and Mz detected by the six-axis force sensor 62; and a distributor 409 for obtaining signals with respect to the seven motor controller-and-drivers 401 to 407 making a Jacobian matrix well known to a person skilled in the art act on output of the six low pass filters 408. Each motor controller-and-driver 40$i$ (i=1 to 7) comprises a compliance controller (not shown) for performing compliance control, based on a force target value TVf$i$ (i=1 to 7) and a position target value TVp$i$ (i=1 to 7) with respect to a motor corresponding thereto; and a speed control loop (not shown) for performing speed control and drive of a corresponding motor, using output of the compliance control and a corresponding signal from the distributor 409. The low pass filters are preferably configured to pass only a component where the not shown speed control loop of the motor controller-and-drivers 401 to 407 can react.

Moreover, in accordance with the present invention the arm controller 152 comprises a gripper vibration suppression controller 410 for performing the vibration suppression of the gripper 71 while carrying goods. The gripper vibration suppression controller 410 calculates six acceleration components added to the gripper 71 from the memorized calibration values Fx0, Fy0, Fz0, Mx0, My0, and Mz0; the goods weight addition values Fx1, Fy1, Fz1, Mx1, My1, and Mz1; and moreover, the detection values Fx, Fy, Fz, Mx, My, and Mz detected by the six-axis force sensor 62R, 62L during carrying, the six acceleration components being:

Fx–(Fx1–Fx0);
Fy–(Fy1–Fy0);
Fz–(Fz1–Fz0);
Mx–(Mx1–Mx0);
My–(My1–My0); and
Mz–(Mz1–Mz0).

Figure 27:
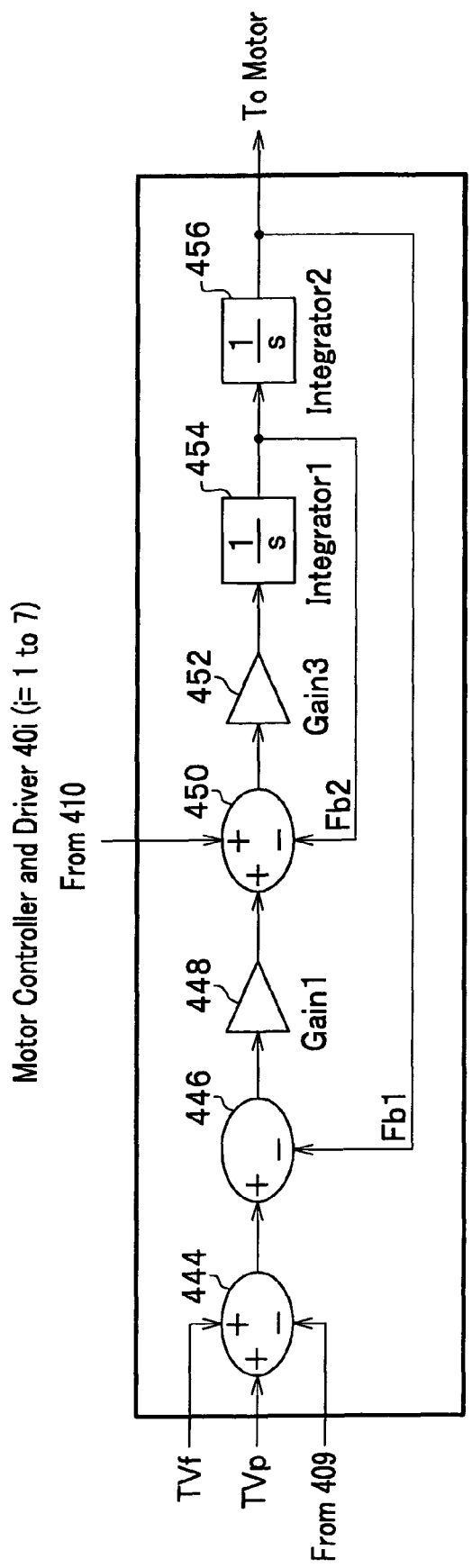
FIG. 27 is a block diagram showing one example of an inner structure of the motor control/drive units in FIG. 22.

The gripper vibration suppression controller 410 comprises six low pass filters (1/(A*S+1)) 420 (A, arbitrary time constant) for passing only an acceleration component which the not shown speed control loop of the seven motor controller-and-drivers 401 to 407 can react out of the six acceleration components; a distributor 430 for obtaining signals with respect to the r controller-and-drivers 401 to 407 making the Jacobian matrix act on output of the six filters 420; and amplifiers 440 for amplifying output signals of the distributor 430 into a proper magnitude. The output of the amplifiers 440 is added to a not shown speed control loop of a corresponding motor controller-and-driver 40$i$ (i=1 to 7). For reference, in FIG. 27 is conceptually shown a configuration example of each motor controller-and-driver 40$i$ (i=1 to 7). In FIG. 27 the motor controller-and-driver 40$i$ (i=1 to 7) comprises an adder and subtracter 444 for subtracting corresponding output of the distributor 409 from a summation of the force target value TVfi and the position target value TVpi; a subtracter 446 for subtracting a from-back-stage feedback amount Fb1 from output of the adder and subtracter 444, an amplifier 448 for amplifying output of the subtracter 446; an adder and subtracter 450 for subtracting a from-back-stage feedback amount Fb2 from a summation of output of an amplifier 440 of the gripper vibration suppression controller 410 and that of the amplifier 448 at the front stage; an integration element 454 for giving the integration value Fb2 where output of an amplifier 454 is integrated; and an integration element 456 for giving the integration value Fb1 where output of the amplifier 454 is integrated.

In addition, although in the distributors 409 and 430 the Jacobian matrix is used; not limited thereto, an arbitrary proper calculation method may also be used.

Figure 26A:
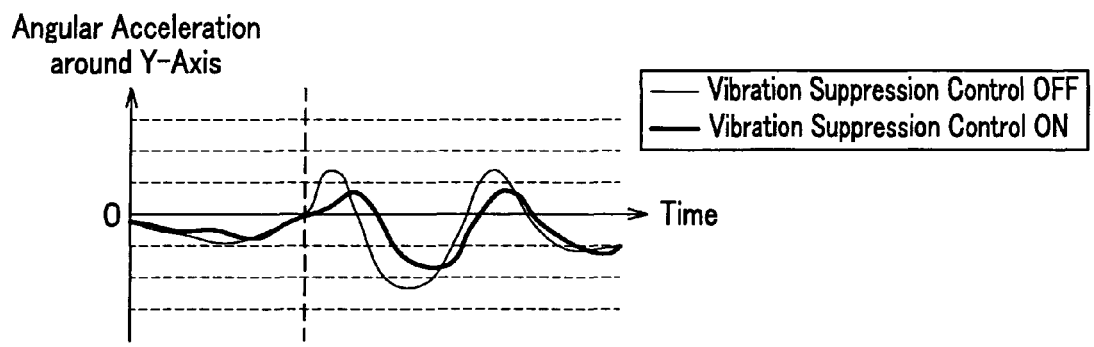
FIGS. 26A and 26B are graphs showing one example of an effect of vibration suppression control.
Figure 26B:
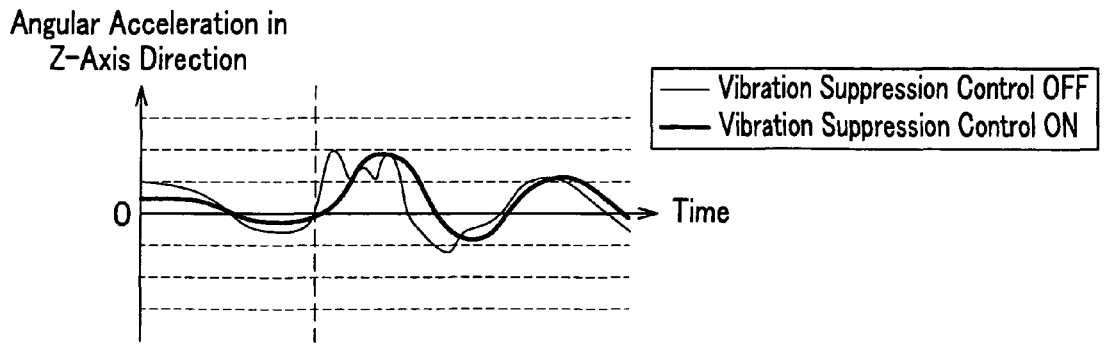

FIG. 26A shows a time variation of an angle speed around the Y-axis added to the gripper 71; FIG. 26B shows a time variation of a Z-axis direction acceleration added to the gripper 71. In FIGS. 26A and 26B thin lines are graphs in a case of vibration suppression control being performed; bold lines are graphs in a case of the vibration suppression control not being performed. In the case of the vibration suppression control being performed, there exists 40% of a vibration suppression effect at a peak.

Thus in accordance with the present invention, by performing the vibration suppression control of the gripper 71 while carrying goods, it becomes possible to suppress a vibration of the gripper 71, that is, of the goods during carrying, and to quietly carry the goods.

Returning to FIG. 20, Arriving at the normal residing place P2 of the person H2 (Yes in a step S63), the robot R stops moving and starts searching her/him (step S64). Detecting a tag identification of the person H2 by the object detector 120 (Yes in a step S65), the robot R acquires an image of the person H2 by the cameras C, C (Yes in a step S66) and moves to her/his front (step S67). Also in the step S67 is preferably performed the vibration suppression control. Thereafter, handing the tray M to the person H2 (step S69), the robot R returns to the waiting state. In addition, because handing the tray M to the person H2 in the step S69 is in detail described in the JP 2004-361467, it will be omitted here.

Figure 25:
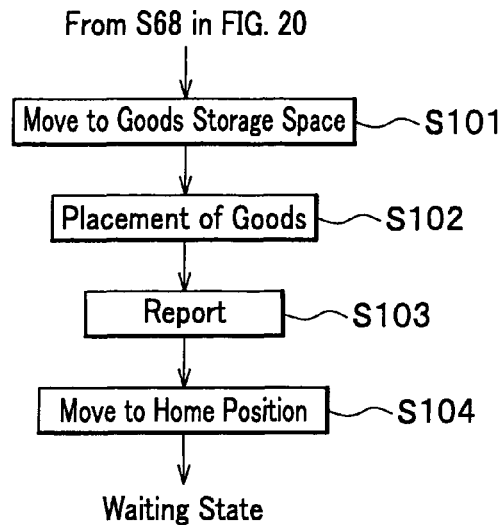
FIG. 25 is a flowchart showing a goods carrying operation according to the robot control system with respect to the embodiment of the present invention and showing a movement of placing the carrier container on a goods storage space in a case of the container being unable to be handed to the person in FIG. 20.

In addition, in a case of the object detector 120 cannot detect the tag identification of the person H2 within a predetermined time (Yes in a step S68), the control is handed to a step S 101 in FIG. 25. A description of FIG. 25 will be made later.

Figure 21:
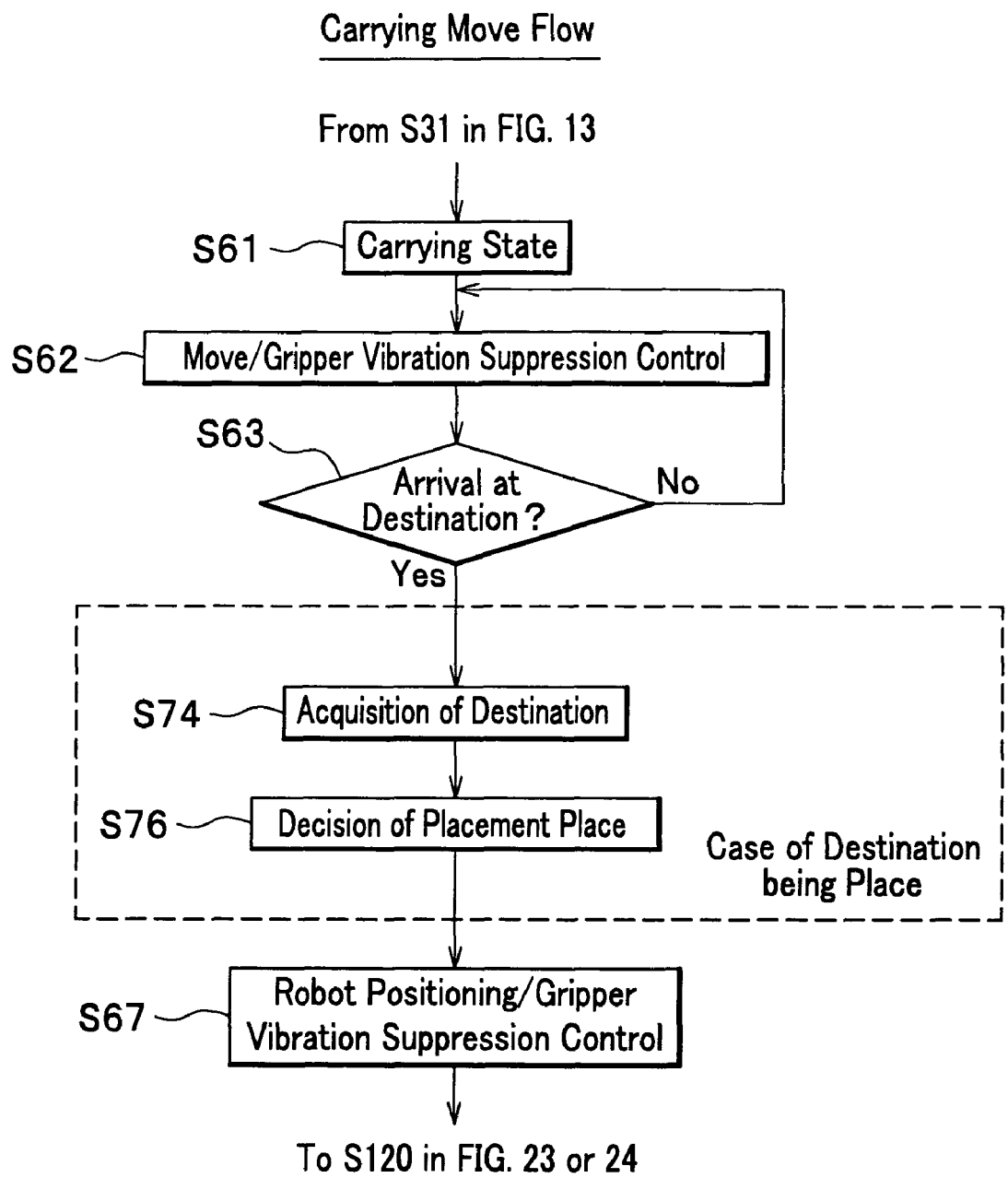
FIG. 21 is a flowchart showing a goods carrying operation according to a robot control system with respect to the embodiment of the present invention and showing a carrying movement in a case of the destination being a place.

Although the above is a carrying movement in a case of a destination being a person, a carrying movement in a case of the destination being a place will be described according to FIG. 21. Because there exist many common points in a flowchart of FIG. 21 with that of FIG. 20, only a difference will be described. In FIG. 21, in a case of the robot R being determined to have arrived at a destination in the determination step S63 (Yes); in a step S74 an image of a destination place is taken in; in a step S76 a placement place of any one of goods and the carrier container M is decided; thereafter, the robot positioning/gripper vibration suppression control step S67 is performed; and the processing proceeds to the step S120 in one of FIGS. 23 and 24 (placement movement flowchart).

<Placement Movement>

Because a handing movement with respect to a person is in detail described in the JP 2004-361467, here will be described a placement movement in a case of a height in a placement place being higher than a lower limit of a movable range of the gripper 71 of the robot R. In other words will be described a placement movement in a case of the placement being able to be performed by only a movement of the arm R3 of the robot R.

Figure 23:
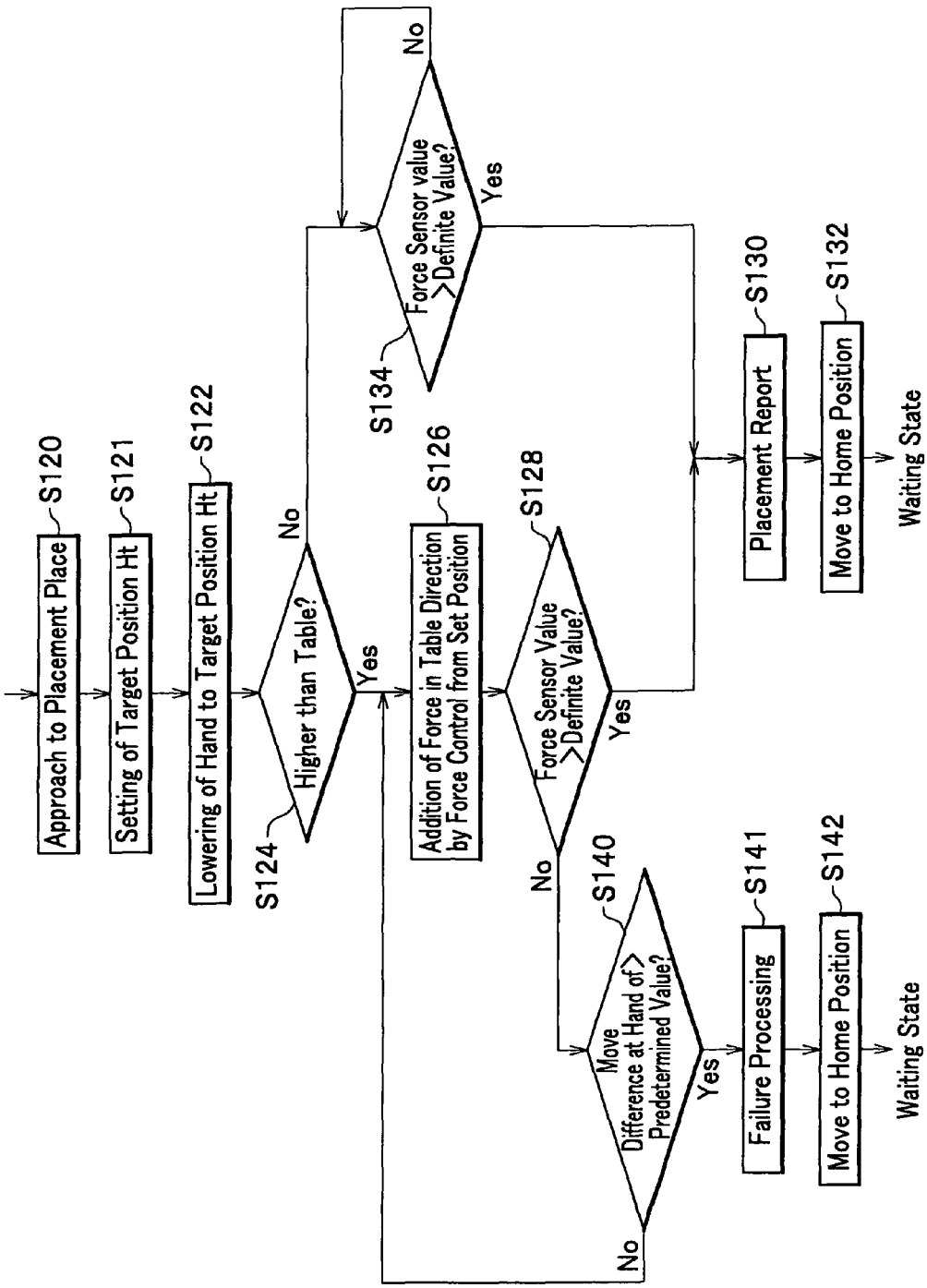
FIG. 23 is a flowchart showing a goods carrying operation according to a robot control system with respect to the embodiment of the present invention, and showing one example of a placement movement in a case of the destination being a place.

In FIG. 23 the robot R firstly moves to a position to be able to place goods on a placement place (step S120); in a step S121 the receipt-and-handover-height decision means 242 sets a target position (value) Ht, based on the height Hs of a placement place (for example, a designated table). For example are set Ht=Hs+(W1>tray height) and the like. The height Hs of the placement place may be acquired from the goods data memory 330 and may be presumed from visual information. In a step S122 the gripper move means 263 issues an instruction to the arm controller 152 so as to lower the gripper 71 to the target position Ht. In a step S124 the receipt-and-handover-height decision means 242 determines whether or not a height Hh of the gripper 71 is higher than the height Hs of the placement place from the visual information. In a case of the height Hh of the gripper 71 being higher than the height Hs of the placement place (Yes in the step S124), in a step S126 the robot R adds a force in a table direction from a current position of the gripper 71; and in a determination step S128 the handing-movement-completion decision means 247 determines whether or not the force sensor values are not less than predetermined values. If so (Yes in the step S128), it means that the tray M is successfully placed; therefore, in a step S130 the robot R reports the placement, and in a step S132, moves to the home position and enters the waiting state.

In a case of the height Hu of the gripper 71 being equal to the height Hs of the placement place in the determination step S124 (No), it can be considered that the tray M of the carried goods is already in contact with the placement place or pushed thereto. Consequently, in a determination step S134 the handing-movement-completion decision means 247 determines whether or not the force sensor values are not less than the predetermined values. Because the arm controller 152 is adapted to lower the gripper 71 to the target position Ht, it repeats the step S134 until the force sensor values exceed the predetermined values. In a case of the force sensor values having exceeded the predetermined values (Yes in the step S134), it means that the tray M is successfully placed; therefore, the robot R proceeds to the step S130 and performs the movement described before.

On the other hand, in a case of the force sensor values having not exceeded the predetermined values in the step S128 (No), the placement-success-or-not determination means 264 determines whether or not a move amount of the gripper 71 has exceeded a predetermined value. In a case of not having exceeded the predetermined value in a further determination step S140 (No), the processing returns to the step S126. In a case of Yes in the determination step S140, because the case means that the gripper 71 has reached a limit of being lowered by only a movement of the arm R3, the placement-success-or-not determination means 264 determines that the placement is unsuccessful. In this case the robot R performs an error processing (step S141), moves to the home position (step S142), and returns to the waiting state (step S142).

Figure 24:
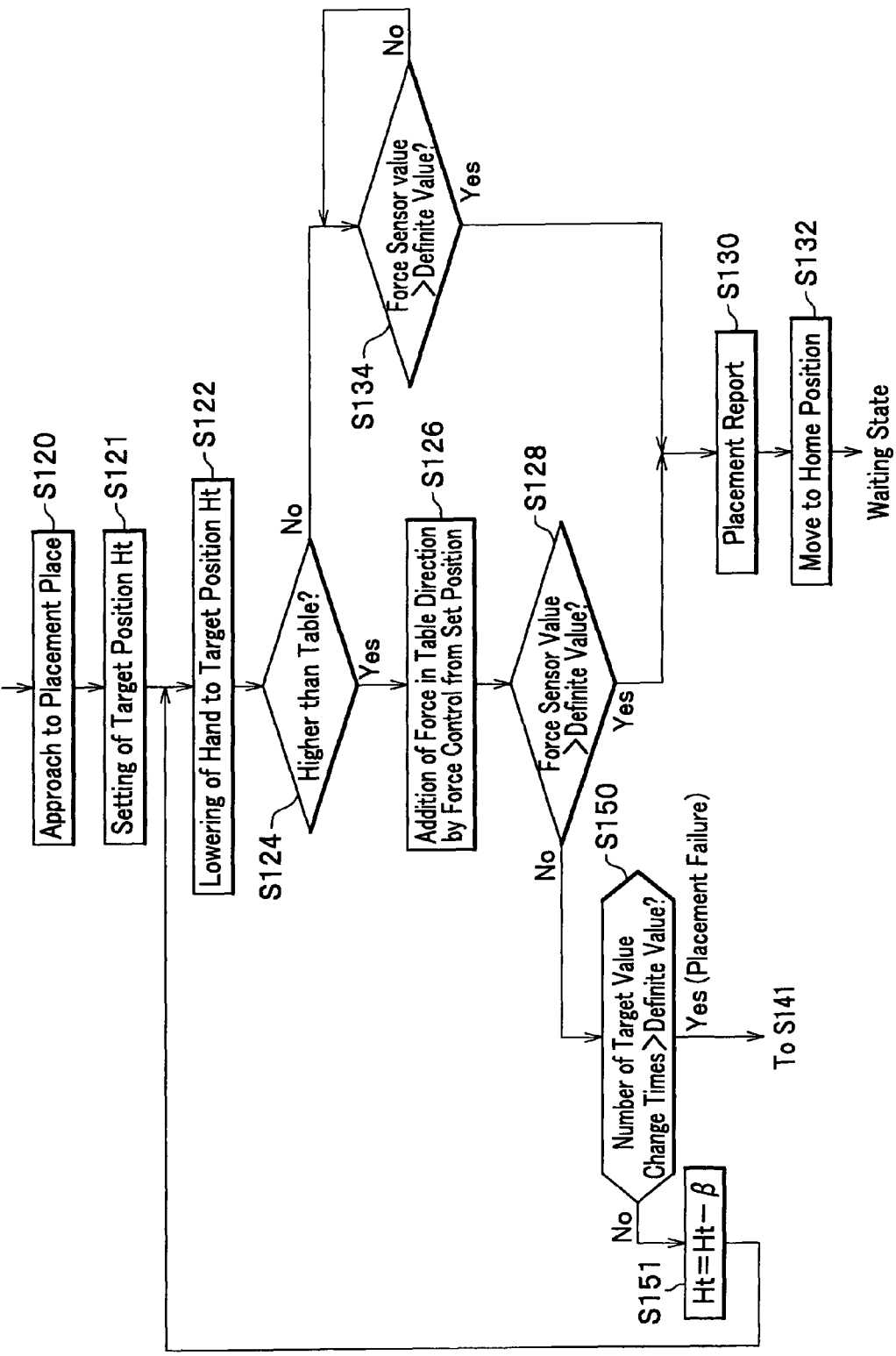
FIG. 24 is a flowchart showing a goods carrying operation according to the robot control system with respect to another embodiment of the present invention and showing another example of a placement movement in a case of the destination being a place.

A placement movement according to another embodiment is shown in FIG. 24. Because a flowchart of FIG. 24 is the same as that of the FIG. 23 except for a flow after the "No" branch in the step S128, only a difference will be described.

In the case of the force sensor values having not exceeded the predetermined values in the determination step S128 (No), there also exists a method of determining whether or not a number of target value change times has reached a predetermined value by the placement-success-or-not determination means 264. In a case of the number of the target value change times having not reached the predetermined value, the method reduces the target value Ht by a predetermined value β in a step S151. In other words, setting Ht=Hs−W2, the processing returns to the step S122. Also in a case of the number of the target value change times having reached the predetermined value in the step S150 (Yes), because the case means that the gripper 71 has reached the limit of being lowered by only the movement of the arm R3, the placement-success-or-not determination means 264 determines that the placement is unsuccessful.

Thus in accordance with the placement movement according to the another embodiment of the present invention, if the height Hs of the placement place is higher than a lower limit of a movable range of the gripper 71 of the robot R, it is possible to place any one of carried goods and tray M on the placement place.

In addition, in a case of the robot R having dropped the tray M, the carrying-state setting means 248 sets the carrying state as "error", and the behavior control means 210 generates an operation report signal of informing of a carrying failure, and outputs the signal to the robot manager 3.

In the embodiments, in a case of the grip angle deviation θ being not more than a predetermined value θ5 (for example, θ=0), the handing behavior determination means 240 determines that the robot R has dropped the tray M.

Furthermore, in a case of the force Fx detected by the six-axis force sensor 62 having changed largely (for example, the tray M has collided with an obstacle during carrying and moving), the robot R temporary stops the autonomous move and waits for the Fx returning to a normal value.

Similarly, in a case of the cameras C, C having detected an obstacle during carrying and moving (for example, a person intersects in front of the robot R), the robot R temporary stops the autonomous move and waits for the obstacle being away from front.

<Goods Storage Space Move>

In FIG. 25, in a case of being unable to having searched the person H2 within a predetermined time (Yes in the step S 68), the robot R moves to the goods storage space B1 from her/his normal residing place P2 (step S101). Also in this case the vibration suppression control is preferably performed.

Then the robot R places the tray M on the goods storage space B1 according to the placement movement (step S102), generates an operation report signal of informing of having placed the tray M on the place B1, and outputs the signal to the robot manager 3 and the exclusive terminal 5 of the person H2 (step S103). Then the robot R moves to the home position from the goods storage space B1 (step S104).

The above thus described is only examples for describing the present invention. Accordingly, it would be easy for a person skilled in the art to perform various changes, modifications, and additions to the embodiments along any of the technical spirits and principles of the present invention.

For example, in order to determine whether or not the robot R has dropped goods during carrying, the external force Fz in the Z-axis direction detected by the six-axis force sensor 62 may also be used. This is because the six-axis force sensor 62 does not detects goods weight and the Fz is lowered in a case of the robot R having dropped the goods.

Furthermore, such a number and disposition of each joint of the robot R may be appropriately changed in design.

Furthermore, although in the embodiments is made the configuration of providing the receipt-and-handover-behavior decision means, a personal position identifying means, the receipt-and-handover-height decision means 242, the stature identifying means, and the person identifying means within respective controllers built in the robot R, a configuration of providing at least one of these means in the robot manager 3 is also available.

In the gripper vibration suppression controller 410 shown in FIG. 22, although all components detected by the six-axis force sensor six-axis force sensor 62, only components including the Fz and the My may be used because they are important factors out of the six components.

What is claimed is:

1. An autonomous mobile robot having an openable and closable gripper for gripping goods, cameras, an autonomous mobile unit, and a control unit for making the robot carry the goods to a destination from an acquisition source, the control unit comprising:
   a grip position recognition unit configured to recognize a predetermined position suitable for gripping a carrier container of a predetermined specification based on an image of the acquisition source taken by the cameras, wherein the carrier container is configured to hold the goods to carry;
   a grip control unit configured to drive the gripper to the predetermined position of the carrier container and to control gripping of the carrier container at the predetermined position; and
   a grip-success-or-not determination unit configured to determine whether or not the gripping is successful, based on an external force acting on the gripper.

2. The autonomous mobile robot according to claim 1 further comprising a vibration suppression controller configured to perform feedback control configured to cancel an external force acting on the gripper during carrying the goods to the destination.

3. The autonomous mobile robot according to claim 2, wherein the vibration suppression controller is provided for every actuator configured to move a joint and configured to determine a movement of the gripper, and comprises:
   an actuator controller configured to control driving each actuator;
   an extraction unit configured to obtain acceleration components added to the gripper, based on the external force acting on the gripper, and to extract only an acceleration component responsive by the actuator controller from the acceleration components; and
   an application unit configured to divide the acceleration component extracted by the extraction unit into a signal for each actuator and to add the divided signal to a speed control loop of a corresponding actuator controller.

4. The autonomous mobile robot according to claim 3, wherein the acceleration component comprises at least one of a vertical direction force added to the gripper, and a moment around an axis in a left and right direction of the robot added to the gripper.

5. The autonomous mobile robot according to claim 1 further comprising:
   a receipt-and-handover-height decision unit configured to decide a target position, based on a height of a placement place where the carrier container of the destination is placed;
   a gripper move unit configured to lower the gripped carrier container to the target position; and
   a handover-completion determination unit configured to determine whether or not the placement of the carrier container is completed, based on the external force acting on the gripper.

6. The autonomous mobile robot according to claim 5 further comprising a placement-success-or-not determination unit configured to determine whether or not a placement is successful before the placement of the carrier container is completed, based on whether the gripper is lowered to a predetermined height.

7. The autonomous mobile robot according to claim 1, wherein the control unit further comprises a learning degree determination unit configured to determine a learning degree of a person with respect to handover in a case of the acquisition source being the person, and wherein the grip control unit adjusts a movement speed, depending on the learning degree, wherein the learning degree is determined to be high, middle, or low.

8. A goods carrying method of making a robot carry goods to a destination from an acquisition source, the robot having an openable and closable gripper for gripping the goods, cameras, and an autonomous mobile unit, the method comprising:

- a grip position recognition step of recognizing a predetermined position suitable for gripping a carrier container of a predetermined specification based on an image of the acquisition source taken by the cameras, wherein the carrier container is configured to hold the goods to carry;
- a grip control step of driving the gripper to the predetermined position of the carrier container and controlling gripping the predetermined position;
- a grip-success-or-not determination step of determining whether or not the gripping is successful, based on an external force acting on the gripper; and
- a vibration suppression control step of performing feedback control configured to cancel an external force acting on the gripper during carrying the goods to the destination.

* * * * *